United States Patent
Sumner et al.

(10) Patent No.: US 10,713,832 B2
(45) Date of Patent: Jul. 14, 2020

(54) PRECOMPUTED ENVIRONMENT SEMANTICS FOR CONTACT-RICH CHARACTER ANIMATION

(71) Applicant: Lucasfilm Entertainment Company Ltd., San Francisco, CA (US)

(72) Inventors: Robert Sumner, Zurich (CH); Xu Xianghao, Zurich (CH); Stelian Coros, Zurich (CH); Mubbasir Turab Kapadia, New York, NY (US)

(73) Assignees: Disney Enterprises, Inc., Burbank, CA (US); ETH Zürich, Zürich (CH)

(*) Notice: Subject to any disclaimer, the term of this patent is extended or adjusted under 35 U.S.C. 154(b) by 269 days.

(21) Appl. No.: 15/157,161

(22) Filed: May 17, 2016

(65) Prior Publication Data
US 2017/0337723 A1    Nov. 23, 2017

(51) Int. Cl.
*G06T 13/40* (2011.01)
*G06T 1/20* (2006.01)

(52) U.S. Cl.
CPC ............... *G06T 13/40* (2013.01); *G06T 1/20* (2013.01)

(58) Field of Classification Search
None
See application file for complete search history.

(56) References Cited

U.S. PATENT DOCUMENTS

| | | | |
|---|---|---|---|
| 6,452,596 B1* | 9/2002 | Gueziec | G06T 9/001 345/440 |
| 8,988,422 B1* | 3/2015 | Hodgins | G06T 13/40 345/419 |
| 2014/0035932 A1* | 2/2014 | Sterchi | A63F 13/56 345/473 |
| 2016/0121214 A1* | 5/2016 | Kruglick | A63F 13/58 463/31 |
| 2016/0366396 A1* | 12/2016 | Kim | G06T 7/70 |
| 2017/0084077 A1* | 3/2017 | Liu | G06T 17/05 |

OTHER PUBLICATIONS

Amato et al. "Choosing Good Distance Metrics and Local Planners for Probabilistic Roadmap Method", Proc.IEEE int. Conf. Robotics and Automation (ICRA), 1998, pp. 630-637.*
Chestnutt et al. "Planning Biped Navigation Strategies in Complex Environments", In Proc. 2003 IEEE Intl Conf. on Humanoid Robotics (Humanoids 2003).*
Min et al. "Interactive Generation of Human Animation with Deformable Motion Models" ACM Transactions on Graphics, vol. 29, No. 1, Article 9, Publication date: Dec. 2009.*

* cited by examiner

*Primary Examiner* — Yanna Wu
(74) *Attorney, Agent, or Firm* — Kilpatrick Townsend & Townsend LLP

(57) ABSTRACT

A method of identifying locations in a virtual environment where a motion sequence can be performed by an animated character may include accessing the motion sequence for the animated character, identifying a plurality of contact locations in the motion sequence where the animated character contacts surfaces in virtual environments, accessing the virtual environment comprising a plurality of surfaces, and identifying the locations in the virtual environment where the motion sequence can be performed by the animated character by identifying surfaces in the plurality of surfaces that match the plurality of contact locations.

20 Claims, 17 Drawing Sheets

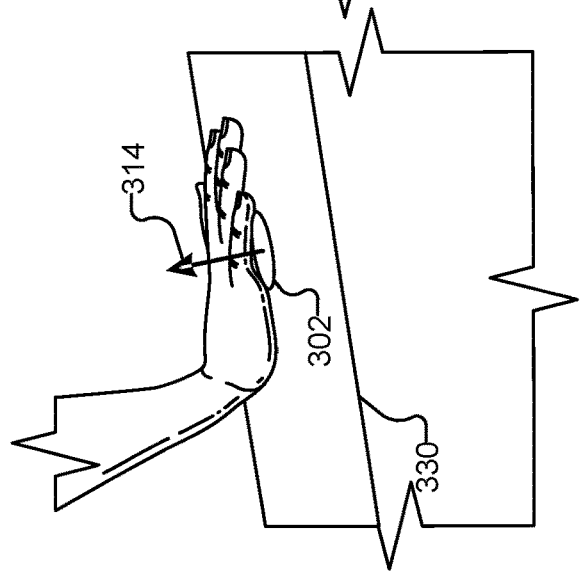
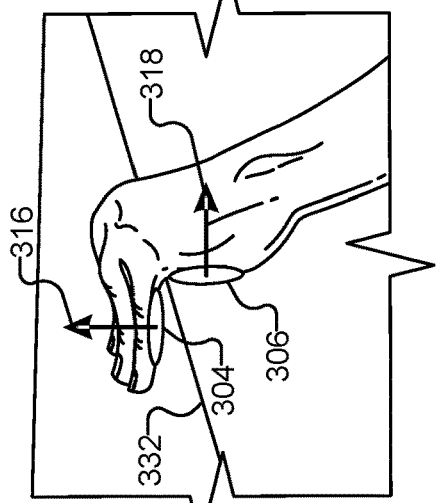
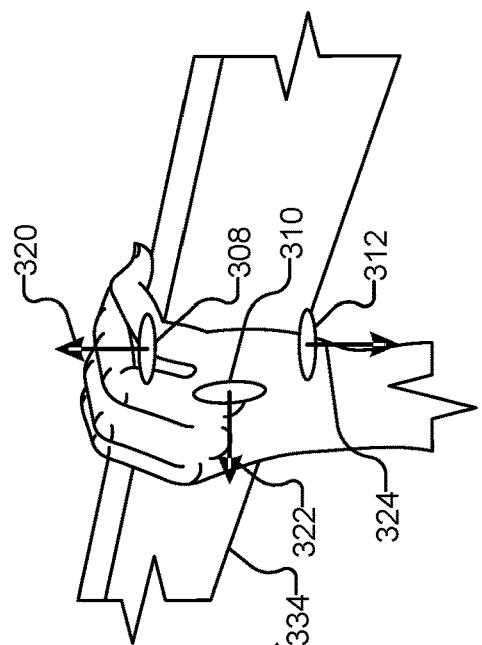

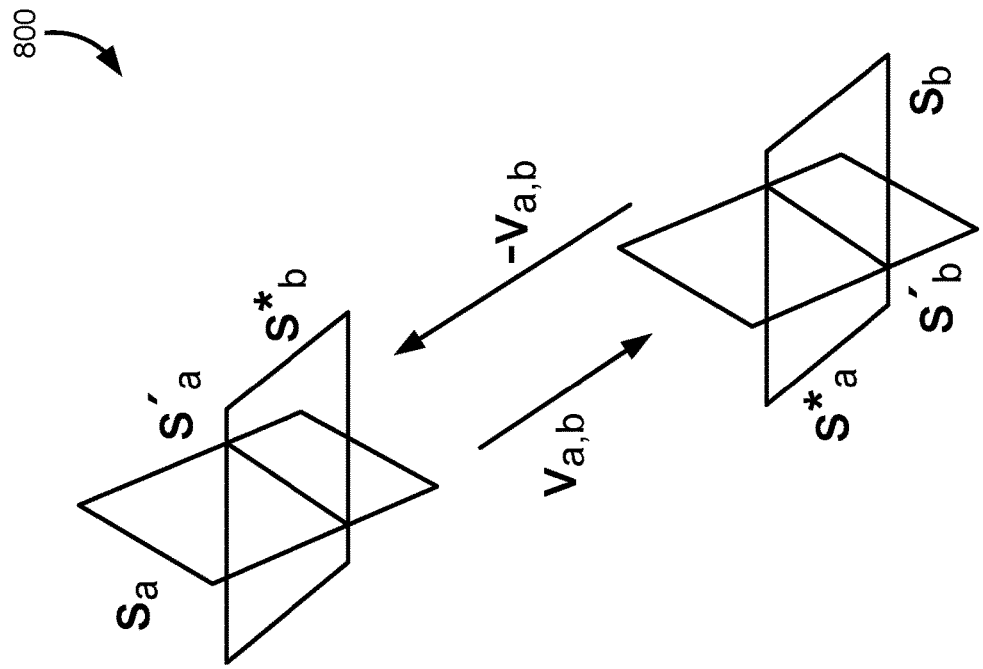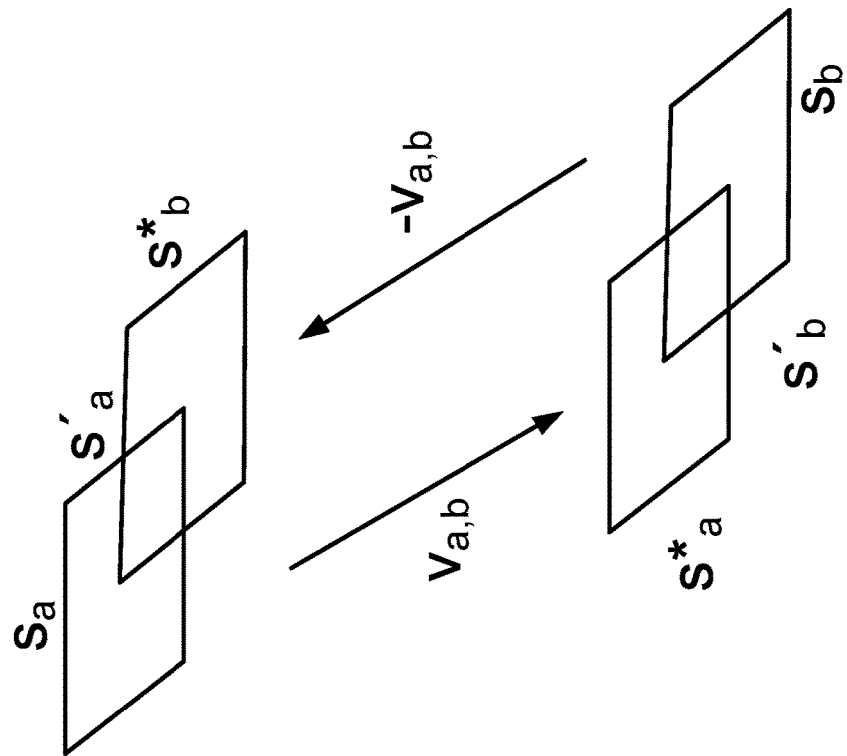
FIG. 8

PRECOMPUTED ENVIRONMENT SEMANTICS FOR CONTACT-RICH CHARACTER ANIMATION

BACKGROUND

Humanoid character animation involves the complex animation of fully articulated virtual humans. Animated characters may rely on motion capture or artist-created content and may move in natural and pleasing ways. These animated characters can be used to create complex, data-driven controllers for animating interactive, responsive virtual characters.

The widespread availability of high-quality motion capture data and the maturity of character animation systems have enabled the design of large, complex, virtual worlds. This has paved the way for the next generation of interactive virtual worlds, which include intricate interactions between characters and the environments they inhabit. However, current motion synthesis techniques have not been designed to scale with these complex environments and contact-rich motion sequence. Current automated approaches for motion synthesis cannot be easily extended to address the increase in environment and motion secquence complexity, particularly for interactive applications, such as video games. Because of this difficulty, environment designers are burdened with the task of manually annotating motion semantics in the environment, which helps informs character controllers which motion sequences a character is able to perform and how, thus pruning the search space for motion synthesis. This, however, is very tedious, especially for intricate motion sequences that involve many contacts between the character and the environment geometry.

BRIEF SUMMARY

In some embodiments, a method of identifying locations in a virtual environment where a motion sequence can be performed by an animated character may include accessing the motion sequence for the animated character, identifying a plurality of contact locations in the motion sequence where the animated character contacts surfaces in virtual environments, accessing the virtual environment comprising a plurality of surfaces, and identifying the locations in the virtual environment where the motion sequence can be performed by the animated character by identifying surfaces in the plurality of surfaces that match the plurality of contact locations.

In some embodiments, a non-transitory, computer-readable medium may include instructions that, when executed by one or more processors, causes the one or more processors to perform operations including accessing a motion sequence for an animated character, identifying a plurality of contact locations in the motion sequence where the animated character contacts surfaces in virtual environments, accessing a virtual environment comprising a plurality of surfaces, and identifying locations in the virtual environment where the motion sequence can be performed by the animated character by identifying surfaces in the plurality of surfaces that match the plurality of contact locations.

In some embodiments, a system may include one or more processors and one or more memory devices including instructions that, when executed by the one or more processors, cause the one or more processors to perform operations including accessing a motion sequence for an animated character, identifying a plurality of contact locations in the motion sequence where the animated character contacts surfaces in virtual environments, accessing a virtual environment comprising a plurality of surfaces, and identifying locations in the virtual environment where the motion sequence can be performed by the animated character by identifying surfaces in the plurality of surfaces that match the plurality of contact locations.

In various embodiments, one or more of the following features may be included in any combination and without limitation. The method/operations may also include calculating distances between the plurality of contact locations, and generating a constraint graph using the plurality of contact locations and the distances between the plurality of contact locations. Identifying the surfaces in the plurality of surfaces that match the plurality of contact locations may include rotating, shifting, and/or translating the constraint graph to identify surfaces that satisfy spatial constraints between the plurality of contact locations. The motion sequence may include a deformable motion sequence, such that at least one pair of contact locations in the plurality of contact locations can be a variable distance apart. The motion sequence may include a selection from the group consisting of: a jump sequence, a hurdling sequence, a tic-tac sequence, a climbing sequence, and a crawling sequence. The motion sequence may be represented by a sequence of motion frames. Identifying the plurality of contact locations in the motion sequence may include identifying one or more keyframes in the sequence of motion frames that include a discontinuity in a direction or rate of motion of the animated character. The method/operations may also include representing a collision volume of the animated character using a combination of cylinders, and using a compound collider to test for collisions at each of the locations in the virtual environment where the motion sequence can be performed by the animated character. The virtual environment may include a plurality of discrete triangles generated in an environmental modeling process. The method/operations may also include clustering adjacent ones of the discrete triangles into larger surfaces that have same surface normal, and performing a breadth-first expansion to neighboring ones of the larger surfaces with same surface normals. Identifying surfaces in the plurality of surfaces that match the plurality of contact locations may include receiving a motion path for the animated character, and identifying surfaces in the plurality of surfaces that match the plurality of contact locations along the motion path. The method may also include displaying, in an environment editing software application, the virtual environment, a graphical representation of the motion path, and graphical indications of the locations in the virtual environment where the motion sequence can be performed by the animated character.

BRIEF DESCRIPTION OF THE DRAWINGS

A further understanding of the nature and advantages of the present invention may be realized by reference to the remaining portions of the specification and the drawings, wherein like reference numerals are used throughout the several drawings to refer to similar components. In some instances, a sub-label is associated with a reference numeral to denote one of multiple similar components. When reference is made to a reference numeral without specification to an existing sub-label, it is intended to refer to all such multiple similar components.

FIG. 3A illustrates a first example of a contact pose.

FIG. 3B illustrates a second example of a contact pose.

FIG. 3C illustrates a third example of a contact pose.

FIG. 8 illustrates a projection and intersection operation for a nondeformable motion skill, according to some embodiments.

DETAILED DESCRIPTION

Figure 1:
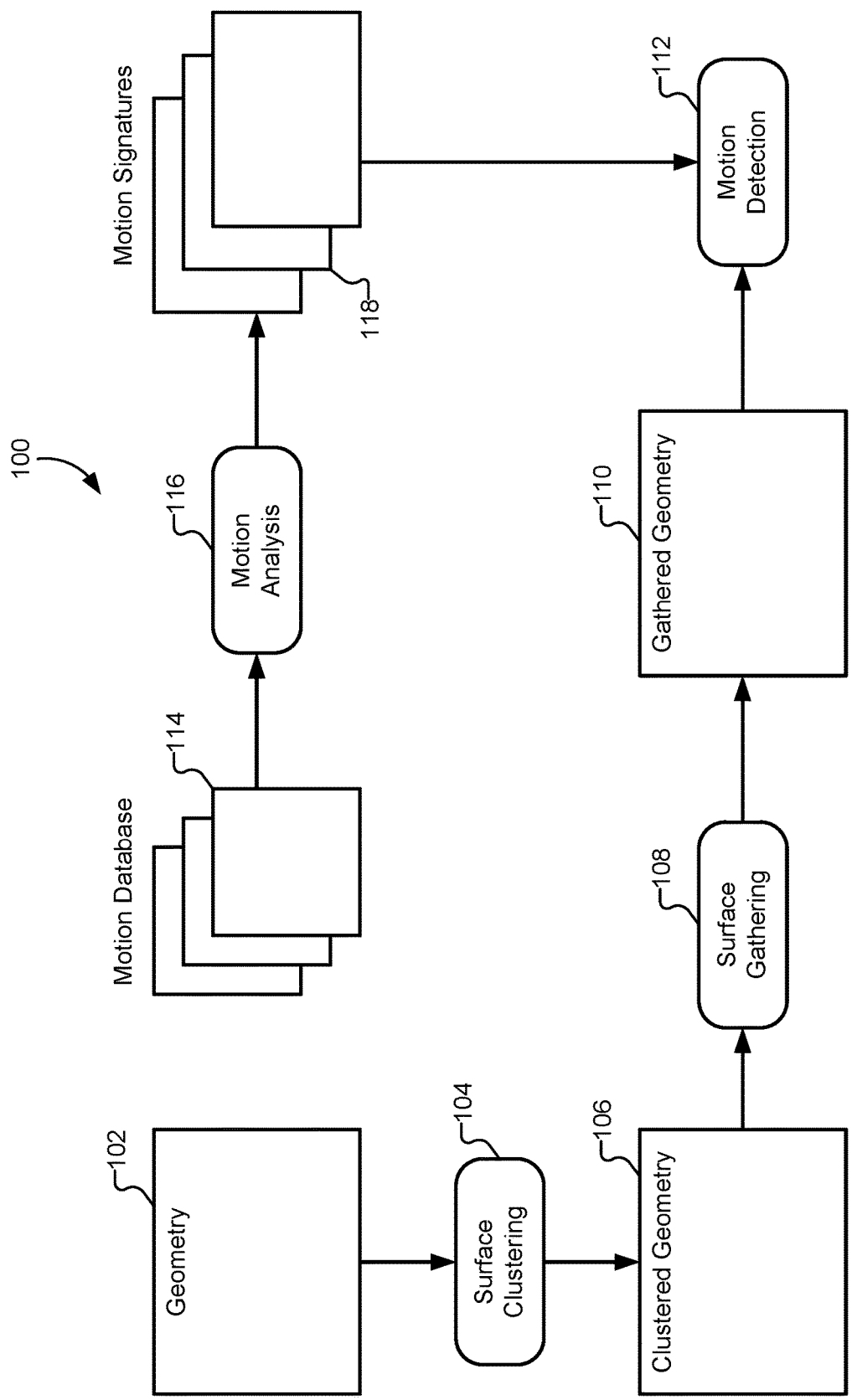
FIG. 1 illustrates a simplified block diagram depicting the major steps for performing analysis for predefined motion sequences, according to some embodiments.

Described herein, are embodiments for an automated approach for analyzing motion sequences and environments in order to represent different ways in which an environment can allow a character to perform predefined motion sequences. Features that characterize the contact-rich motion repertoire of a character can be analyzed, and valid transitions in the environment where each of these motions may be possible may be detected. Semantics can be added to the environment that identify motion sequences which surfaces in the environment characters may use for support during predefined motion sequences. This information can then be integrated into standard navigation and animation pipelines in order to greatly enhance the motion capabilities of virtual characters. The computational efficiency of this approach also enables two additional applications. First, environment designers can interactively design new environments and receive instant feedback on how characters may potentially interact with the environment in real time as the environment is being designed. This can be used for iterative modeling and refinement. Second, end users can dynamically edit virtual worlds and characters, and these embodiments may automatically accommodate the changes in the environment into new movement strategies.

These embodiments present an automated approach for computing the semantics of how a character can interact with a set of environment geometries. Given a database of predefined motion sequences representing arbitrarily complex, contact-rich behaviors of a virtual character, these embodiments first analyze the predefined motion sequences in order to define respective motion signatures that characterize (i) the contacts between the character and environment surfaces, (ii) spatial relationships between contacts, and (iii) the collision representation of the character.

For any 3D environment, these embodiments automatically identify a sequence of proximal surfaces that satisfy the constraints of a specific motion sequence, using a projection and intersection method that efficiently identifies the spatial relationships between surfaces without the need for global sampling or discretization. These embodiments also take into account surface-hand contacts and deformable motion models. These motion sequences, along with their associated semantics, can be easily integrated into standard navigation systems to enhance the movement repertoire of virtual characters.

Furthermore, these embodiments may enable interactive authoring sessions where environment designers may iteratively design environments and receive instant feedback of how characters may potentially interact with the environment as it is designed. End users may dynamically change game worlds and observe virtual characters, automatically modifying their movement strategies in order to accommodate motion sequences which may have been invalidated or made possible as a result of the environment changes. These embodiments can be seamlessly integrated into existing animation and navigation pipelines.

FIG. 1 illustrates a simplified block diagram 100 depicting the major steps for performing analysis for predefined motion sequences, according to some embodiments. The process may be comprised of two analysis tracks. The first track begins with raw motion data, and the second track begins with raw environmental data. The system analyzes both data sets in order to determine valid motion sequences that can be performed in the environment. Motion sequences can then be allocated in the environment and combined with standard navigation mesh representations for runtime path-finding and motion synthesis.

The motion analysis segment of the pipeline begins with a motion database of individual motion clips 114 representing different motion sequences for a character. As will be described in greater detail below, the process can analyze each motion sequence (or set of similar motion sequences) to define a respective motion signature. The motion process analysis 116 characterizes the different contacts between a character's body parts and the environment during the motion sequence. Spatial constraints between pairs of contacts as well as collision boundaries of the character may also be calculated as the motion sequence is performed. A set of motion signatures 118 corresponding to the motions in the individual motion clips 114 in the motion database can then be sent forward to the motion detection process 112.

The geometry analysis segment of the pipeline may begin with an arbitrarily complex 3-D environment comprised of a plurality geometries 102. These embodiments may utilize a surface clustering process 104 to identify parallel and contiguous surfaces that can support a character's contact during a motion sequence. Each motion signature will include a sequence of proximal contact surfaces. Sequences of proximal contact surfaces can be identified that satisfy spatial constraints between the contacts in the motion signature. As will be described in greater detail below, a projection- and intersection-based method can efficiently identify spatial relationships between surfaces and can handle deformable motion models. A surface gathering process 108 can yield sets of gathered geometries 110 that ensure the resulting motion sequences performed in these parts of the environment are collision-free. The result is an annotated environment that identifies areas where motion sequences are possible.

Motion detection process 112 can extend traditional navigation graph approaches to include additional edges for connecting disconnected surfaces during a particular motion sequence. Semantics that codify motion, contact, and collision constraints can be displayed during runtime. Standard search techniques can be used on a navigational graph to generate a path that includes these motion sequences. A data-driven animation system can be used to animate characters along this path, and the annotated motion sequences can be used to animate the character performing complex animations that satisfy the exact contact constraints without the need for expensive configuration-space motion planning.

Motion Analysis

Figure 2:
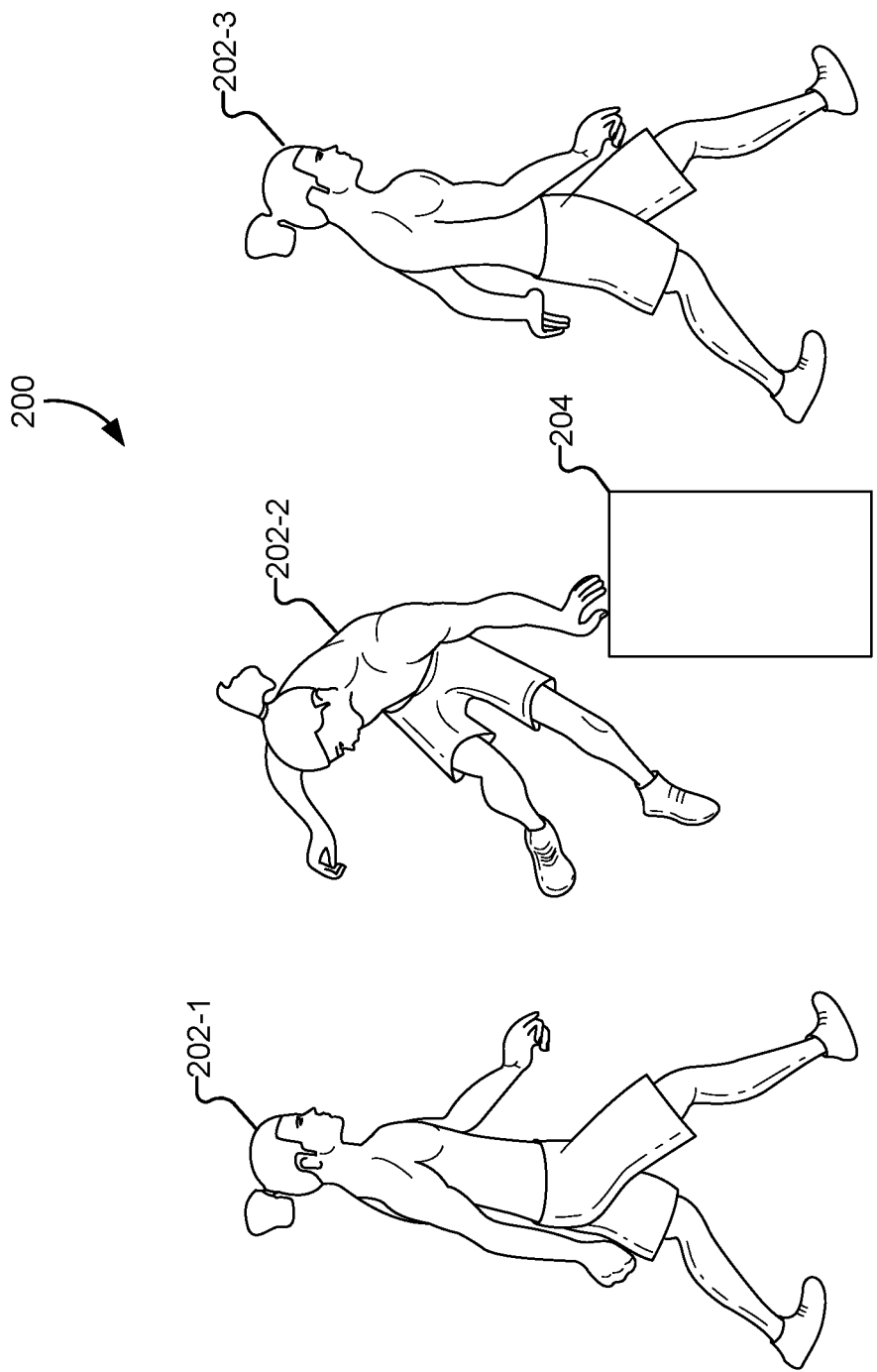
FIG. 2 illustrates an animation of a human character performing a predefined motion sequence to elevate up and over an obstacle, according to some embodiments.

An animated character in a videogame environment or CGI animation sequence may be assigned a movement repertoire, or predefined set of motion sequences, that define physical "stunts" or "skills" that may be performed by the character. For example, FIG. 2 illustrates an animation 200 of a human character performing a predefined motion sequence to elevate up and over an obstacle, according to some embodiments. As the character approaches the obstacle 204 in pose 202-1, the character may extend his left hand and place it on the top of the obstacle 204. Pose 202-2 shows the human character beginning to push on his left hand to elevate up and over the obstacle 204. Pose 202-3 shows the human character after he has landed on the other side of the obstacle 204. This sequence of poses 202 may be referred to herein as a predefined motion sequence, or simply "motion sequence." A motion sequence may be executed automatically when a character approaches geometries in the environment that allow the motion sequence to be performed. In animation 200, the motion sequence for hopping over the obstacle 204 is made available as the character approaches the obstacle 204. For example, a user controlling the animated character may simply move the character towards the obstacle 204 and the predefined motion sequence may be automatically executed. In another example, a user controlling the animated character may press a button on his/her controller that triggers the predefined motion sequence when the character is close enough to the geometry 204. Predefined motion sequences such as these allow characters to display complex and diverse movements beyond the typical walk, run, jump, crouch, etc., that were previously available.

Predefined motion sequences of this sort are particularly useful in modern video games and other computer animated video sequences. The problems solved by the embodiments described herein include analyzing a set of predefined motion sequences represented by motion clips, along with environment geometries to determine where in the environment each type of predefined motion sequence can be performed. Additionally, the embodiments described herein allow environment designers to interactively design a virtual environment and see where predefined motion sequences for various animated characters are available in real-time.

In order to describe the details of how predefined motion sequences can be analyzed and how they can be matched with specific environment locations, this description will include both mathematical and set theory notation that will be within the understanding of one having ordinary skill in the art. To begin, the movement repertoire of an animated character may be defined by a set of motion sequences denoted as M. The set of motion sequences may include one or more individual motion sequences m∈M. A motion sequences may be represented by a single motion clip or a set of similar motion clips which can be blended together to create a parameterized motion sequence that can produce new contact variations with environment geometries that are not present in the original motion sequences.

Many different models for motion interpolation or deformation may be used, and the embodiments described herein do not depend on the exact representation of motion. Each motion sequence m is represented as m=⟨G, V, L⟩, where the contact constraint graph G=⟨C, E⟩ is defined by a set of contacts c∈C, and spatial constraints e(i,j)∈E between pairs of contacts $(c_i, c_j)$∈C. Additionally, V represents the collision bounds of the character over the course of the motion. L represents a data-driven controller that is used for animating the character, and may include a single motion clip coupled with inverse kinematics, or a parameterized blend tree of similar motions.

Over the course of the motion sequence, different parts of the character's body might come in contact with different surfaces of the environment. A contact pose p={$c_i$} may be defined as a pose where a body part (e.g., hands or feet) comes in contact with one or more surfaces in the environment. Each contact c={x, n} denotes the contact of a body part with one environment surface, defined using the relative position x and the surface normal n of the contact, with respect to the initial position of the center of mass of the character.

FIG. 3A illustrates a first example of a contact pose, depicting a simple planar contact pose. The contact c includes the relative position x 302 where the hand contacts the geometry 330 of the environment. The contact c also includes the surface normal n 314 with respect to the initial position of the center of mass of the character. In this case, the surface normal n extends perpendicular to the surface of the environmental geometry towards the character. FIG. 3B illustrates a second example of a contact posep, depicting an L-shaped contact pose. In this example, two surfaces with an angle between the normals close to 90° are contacted by the character placing hands or other body parts on the perpendicular edge in the environment. There are two contacts c in this posep. The first contact c includes position x 304 where the fingers contact the top of the geometry 332 with surface normal n 316. The second contact c includes position x 306 where the palm contacts the side of the geometry 332 with surface normal n 318. FIG. 3C illustrates a third example of a contact pose, depicting a grasping contact where three planar surfaces. This may correspond to placing the hand of a character on or around a curved surface in the environment. This third example includes three contacts c in the pose: position x 308 with surface normal n 320 where the fingers contact the top of a geometry 334; position x 310 with surface normal n 322 where the palm contacts the side of the geometry 334; and position x 312 with surface normal n 324 where the thumb contacts the bottom of the geometry 334.

Figure 4:
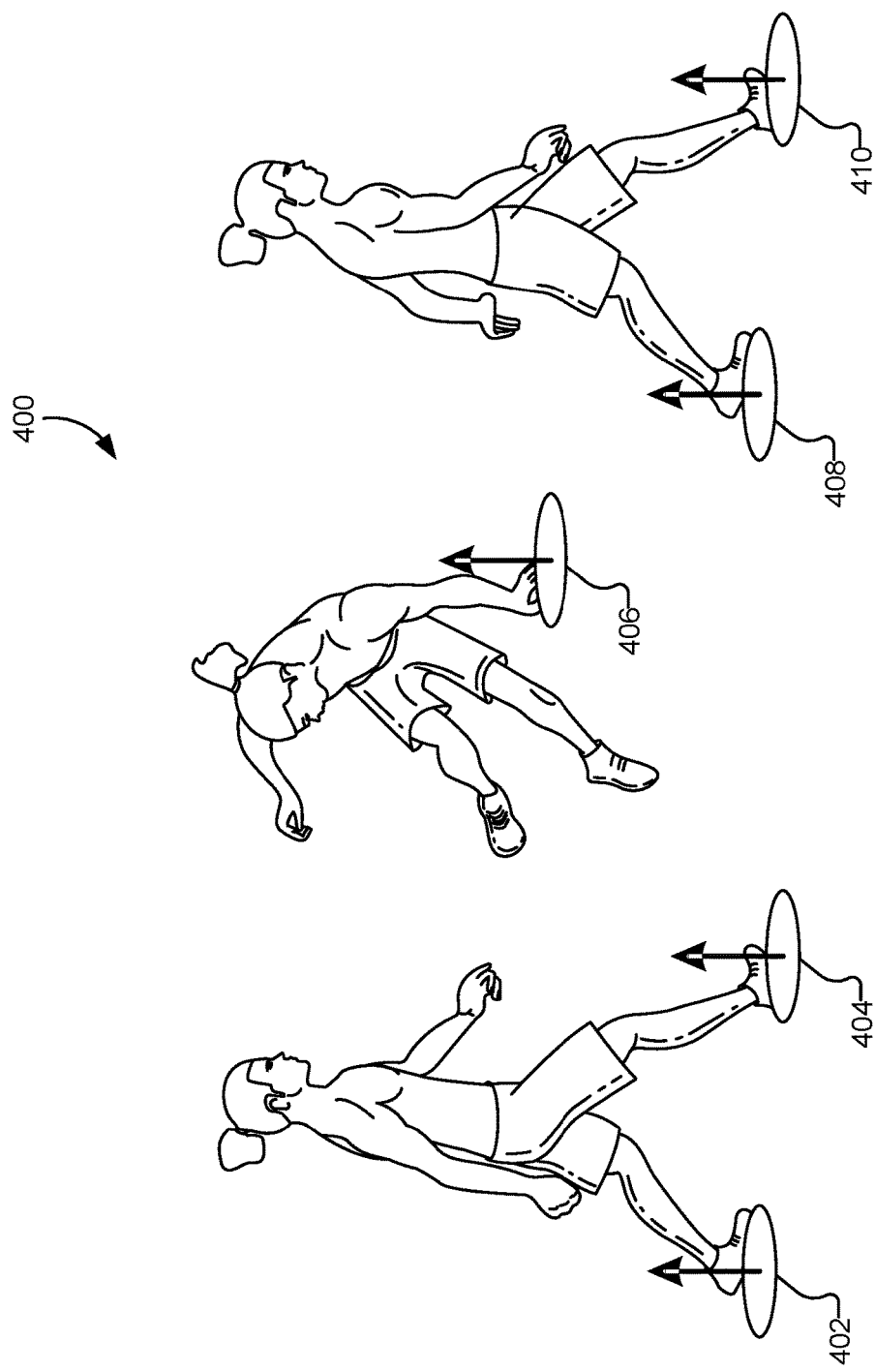
FIG. 4 illustrates a set of keyframes for a motion clip for an animated character vaulting over a wall or obstacle.
Figure 5:
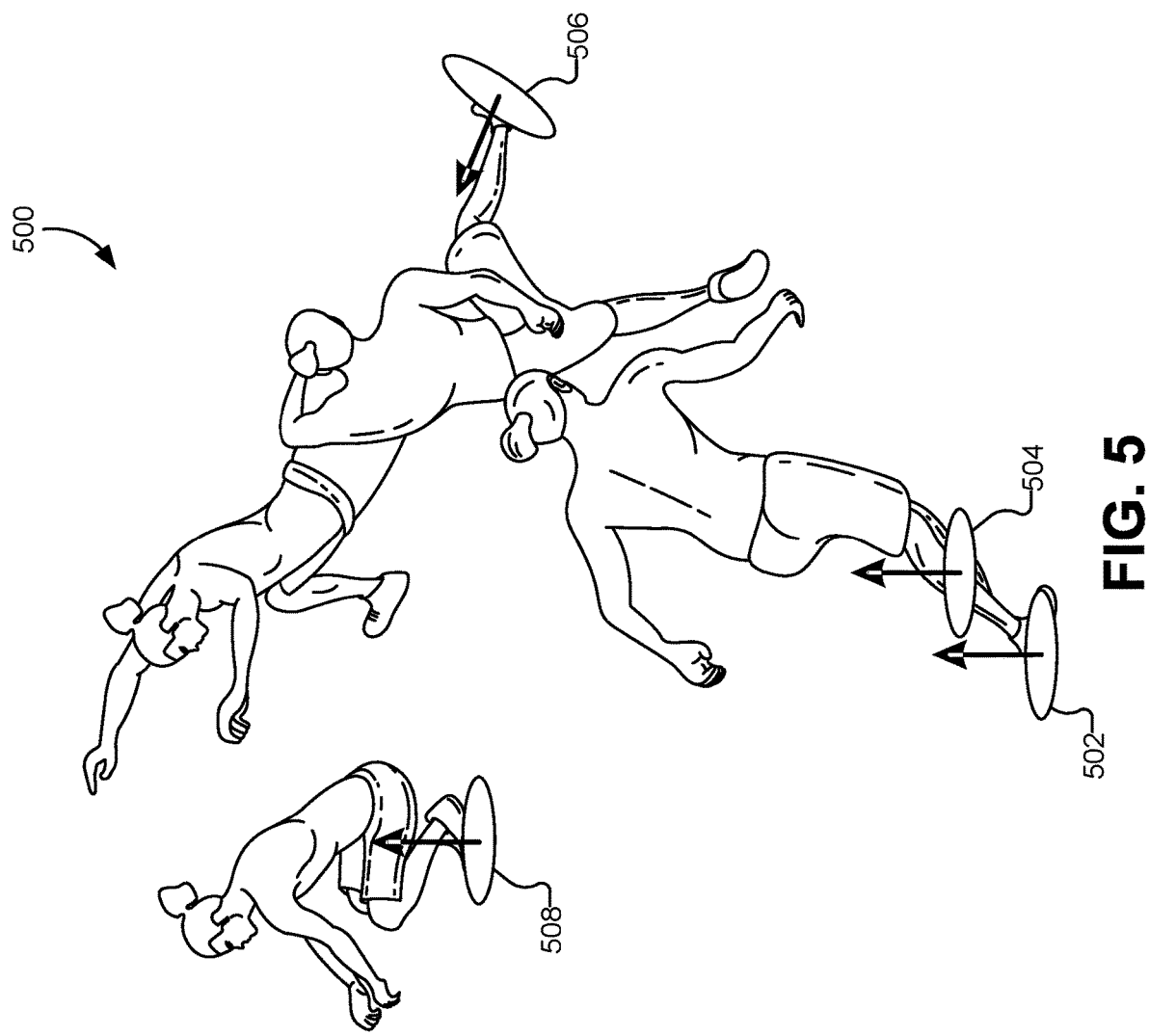
FIG. 5 illustrates a set of keyframes for a motion clip for an animated character performing a "tic-tac" motion sequence.

For each motion, a set of keyframes may be identified in which a contact takes place using a semi-automated method. For example, some methods may analyze successive frames in a motion sequence to identify discontinuities in the direction, velocity, and/or acceleration of points during motion sequence. These discontinuities indicate a sudden stop or change direction that is likely to coincide with a contact being made with an environment geometry. A keyframe may have multiple body parts in contact at a time, leading to simultaneous contact poses. FIG. 4 illustrates a set of keyframes 400 for a motion clip for an animated character vaulting over a wall or obstacle. The first keyframe includes two contacts 402, 404. The second keyframe includes one contact 406. The third keyframe includes two contacts 408, 410. FIG. 5 illustrates a set of keyframes 400 for a motion clip for an animated character performing a "tic-tac" motion sequence, where the character "runs" up a wall to gain access to a higher elevation. Each of the four keyframes includes at least one contact 502, 504, 506, 508. Note that the contacts may be made with different pieces of environment geometry, such as the ground, a wall, and the geometry of the higher elevation.

Figure 6:
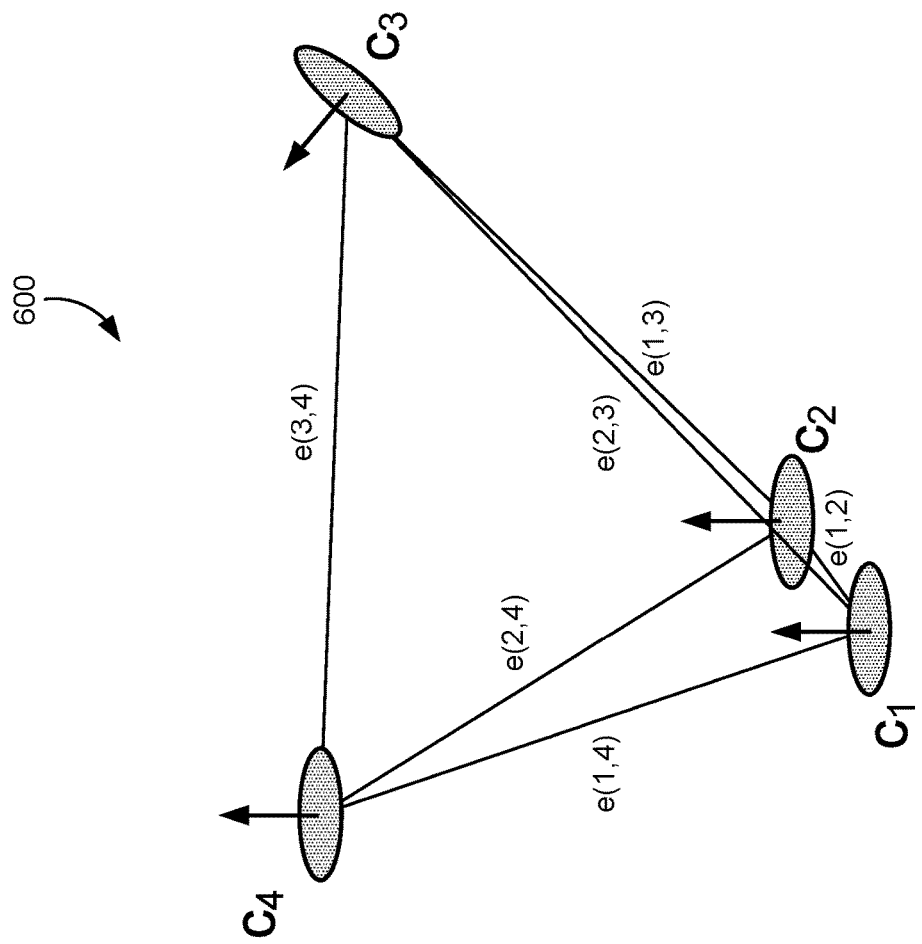
FIG. 6. illustrates a constraint graph for the tic-tac motion in FIG. 5.

Once the keyframes have been identified, a constraint graph between each contact can be developed. The constraint graph can represent constraints between all pairs of contacts. This may be useful for specifying global constraints, for example, such as lower and upper limits between the first and last contacts for the motion sequence to be executed. A constraint $e(1, 2) \in E$ defines the distance interval (dmin, dmax) between the two contacts $c_1, c_2 \in C$. For a motion skill that is a single motion clip without any deformation, this may be a single numeric value. (It is not necessary to consider temporal constraints, as they are not necessary in a static snapshot of an environment.) FIG. 6. illustrates a constraint graph 600 for the tic-tac motion in FIG. 5. The constraint $e(1, 2)$ may be defined as the distance between the two contacts $c_1, c_2$. The value of the constraint may be single value for absolute motions, or an interval for motions that allow for procedural deformation (e.g., motions where the character can adapt to small variations in environment geometry). For example, a the tic-tac motion may be able to accommodate small variations in distance between the wall and the elevated surface. Instead of coding a hard numeric value for the distance constraint, a distance interval (dmin, dmax) between the two contacts may instead be specified. This allows environment designers more leeway in spacing environmental geometries.

Some motion sequences may be referred to as deformable motion sequences. In addition to allowing for variations in geometry spacing, the formal motions may allow the CGI character to adapt to changes in geometry. For example, a first motion sequence may illustrate a standing jump of approximately 1 m. A second motion sequence may illustrate a standing jump of approximately 2 m. A third motion sequence may illustrate standing jump of approximately 3 m. In some embodiments, the similarity between each of these three motion sequences and be recognized, and a single contact graph may be created to cover all three motion sequences. The contact for the jump and landing will have the same geometry normal components; however, the distance constraint between the two contacts may be defined as (1 m, 3 m). In addition to a standing jump, other examples may include swinging from various obstacles, climbing walls of different heights, and so forth.

At this point, the process has analyzed the different motion sequences of a character, combined any similar motion sequences that can be combined, and then for each motion sequence, identified keyframes in which contact is made between the character and the environment, and identified contact positions, normal directions, and distance constraints for each contact. In order to accurately handle the complex interactions between characters and the environment, the system should satisfy not only contact constraints but also collision constraints. In other words, a set of environment geometries may allow for the performance of a particular motion skill; however, other environmental geometries may be in the way such that the character would visually collide with these geometries while performing the motion sequence. For example, a character may be able to tic-tac up a building onto a ledge, but in doing so would visually collide with a telephone pole. In order to not only identify potential locations for motion sequences to be performed, the process must also detect character collisions with other environmental geometries such that these locations can be eliminated as a candidate location for a particular motion sequence.

One approach is to precompute a sweeping volume of the character's mesh over the course of the motion sequence, which can be then used for collision checks. However, this is very computationally expensive. To enable motion sequence collision detection at interactive rates (useful for interactive authoring or games), the embodiments described herein instead provide a coarse approximation of the character's collision model as follows.

For each motion skill, the process may first extract the representative keyframes from trajectories of a subset of the joints (e.g., the head, root, feet, and hands). A process known in the art as a "compound collider" may use a combination of cylinders that is constructed to roughly approximate the collision volume of the character at each of these keyframes, and then use the approximation to determine if a collision takes place. This coarse collision representation presents a tradeoff between computational performance and accuracy, and may produce false positives or negatives. However, this method has been shown by the inventors to work well for performing motion sequences as described herein. Applications that have strict requirements on accuracy may use more complex collision representations.

Environmental Analysis

Once the motions have been processed the environment may be analyzed to automatically detect locations where motion skills may occur. Having analyzed the library of motion sequences for a particular character and generated corresponding constraint graphs, the process can begin analyzing the geometries of an environment. For example, when designing an environment for a videogame or animated sequence, an environment designer may select a particular character. The design interface may load the collision constraint graphs for the particular character and analyze, in real-time, the environment to find candidate locations for each motion sequence to be performed.

The environment, denoted as W, may be represented as a collection of objects o. The geometry of each object may be represented as a set of discrete triangles generated from an environment modeling stage. First, adjacent tri-angles may be clustered into larger surfaces, each denoted as s, that have the same surface normals $n_s$. Starting from a triangle in the environment, a breadthfirst expansion may be performed to neighbouring triangles. Adjacent triangles that have similar facing normals may be clustered. This process clusters the environment triangulation into a set of contact surfaces $s \in S$, where s is a collection of adjacent triangles that face the same (or very similar) direction.

Figure 7B:
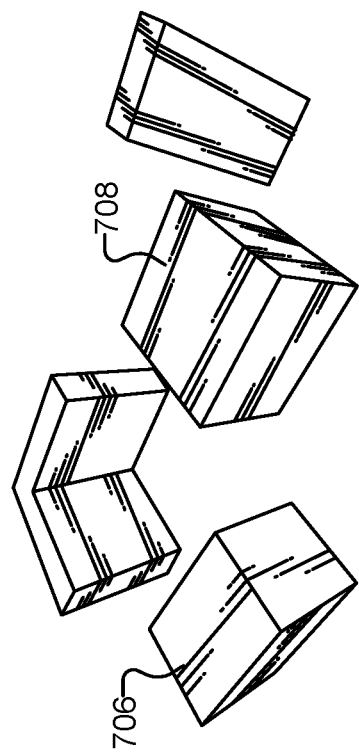
FIG. 7B illustrates contact surfaces of the environmental geometries after the clustering process described above, according to some embodiments.
Figure 7A:
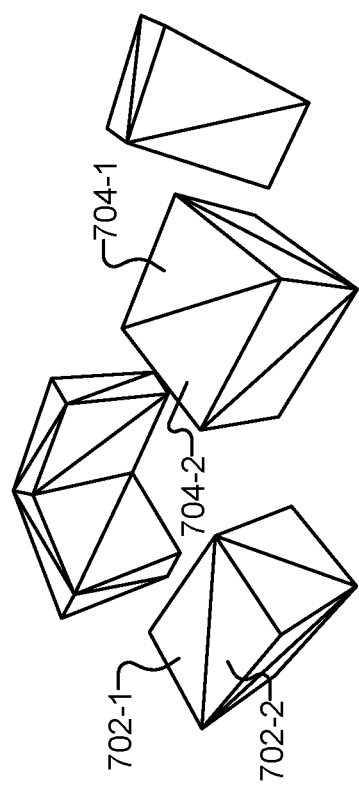
FIG. 7A illustrates contact surfaces of environmental geometries before the clustering process described above, according to some embodiments.

FIG. 7A illustrates contact surfaces of environmental geometries before the clustering process described above, according to some embodiments. A first rectangular box has a top surface composed of two triangular geometries, 702-1 and 702-2. A second rectangular box also has a top surface composed of two triangular geometries, 704-1 and 704-2. It should be noted that other environmental design processes may use primitive geometries other than triangles, but the embodiments described herein will work with any primitive geometry. FIG. 7B illustrates contact surfaces of the environmental geometries after the clustering process described above, according to some embodiments. By identifying adjacent triangles 702-1 and 702-2, along with adjacent triangles 704-1 and 704-2, the clustering process can combine these geometries into a single contact surface composed of adjacent triangles that face in the same direction. The term "same direction" maybe approximate, such that angles of less than 5%, 10%, 15%, or 20% between triangles may be considered the "same direction." This allows for curved surfaces to be processed as a single contact surface for purposes of identifying locations for motion sequences. After grouping and clustering triangles into surfaces, the process may next group surfaces that share the same normal properties into a group surface. Even though surface 706 and surface 708 are not contiguous, they are are coplanar and within a predetermined distance of each other. By grouping surface 706 and surface 708, the process can consider them to be a single surface for motion sequence. For example, a character performing a standing jump may have a contact constraint graph that has to contact points on the same surface (e.g., the ground). That same standing jump motion sequence may be performed between surfaces 706 and 708 by grouping them together.

Given a set of grouped surfaces s∈S characterizing the environment, some embodiments next seek to identify spatially co-located surfaces that satisfy the constraints on the constraint graph of a specific motion sequence—while avoiding collisions with any geometry—and to identify any valid subregions on each surface where each contact in the motion sequence might take place. The first step is to rotate the constraint graph such that it is aligned with the groups geometry surfaces. The contacts c∈C of a motion skill m contain the relative positions of all contacts in the motion sequence with respect to the initial position of the character's center of mass, and assumes that the character is initially facing along a particular axis in the coordinate space of the environmental geometry, (e.g., the positive X axis). To detect the execution of the motion sequence in any direction, the set of valid start directions may be sampled. The constraint graph is then transformed/rotated for the chosen direction. The spatial constraints between contacts remain unaffected as a result of this rotation; only the orientation changes. This allows a motion sequence to be aligned with a motion direction of the character during any animated sequence.

After rotating the constraint graph to be aligned with the direction of the character's motion, the process may next identify all contact surfaces $s_i \subseteq S$ with a surface normal consistent with each contact $c_i \in C$ for the particular motion skill. Identifying the contact surfaces may be performed by comparing the surface normals for each contact with the surface normals of each group of surfaces.

For each pair of contact surfaces $(s_a, s_b) \in S_1 \times S_2$, the subregions $(s_a, s_b)$ on each surface can be found such that the spatial constraint e(1,2) between the first two contacts $c_1$ and $c_2$ in the motion are satisfied, as will be described in greater detail below. This produces a new set $R \in S_1' \times S_2'$ comprising pairs of contact surfaces that satisfy the spatial constraint between the first two contacts. This process may be iteratively repeated for each subsequent contact in C to produce $R \in S_1' \times \ldots S_{|C|}'$, which contains a set of surface sequences that accommodate all the contacts in the motion sequence, and each surface represents the set of all valid locations where the particular contact in the motion may take place.

Each sequence of candidate surfaces in $r = \langle s_1, \ldots s_{|C|} \rangle \in R$ may additionally be checked to see if the motion produces collisions with any aspect of the environment. This translates into finding all points in the starting region $s_1 \in r$ such that the motion can be successfully performed starting from that location. Surface $s_1$ can be adaptively subdivided to find all subregions within the start region that are collision-free. The collision check may be performed using the coarse collision representation of the motion described above. This process may divide a starting region into multiple disconnected regions in which the motion skill maybe performed.

The spatial relationship between two contact surfaces can be checked and the process may return subsurfaces that satisfy the distance constraint imposed between them, as specified by the contact constraint graph. For a nondeformable motion sequence (e.g., a single motion sequence with no procedural modification), the spatial constraint may be a single distance value. For motion sequences that have deformable motion models (e.g., a blend tree of multiple similar motion sequences and/or procedural deformation using inverse kinematics), this may instead be a distance interval.

Figure 9:
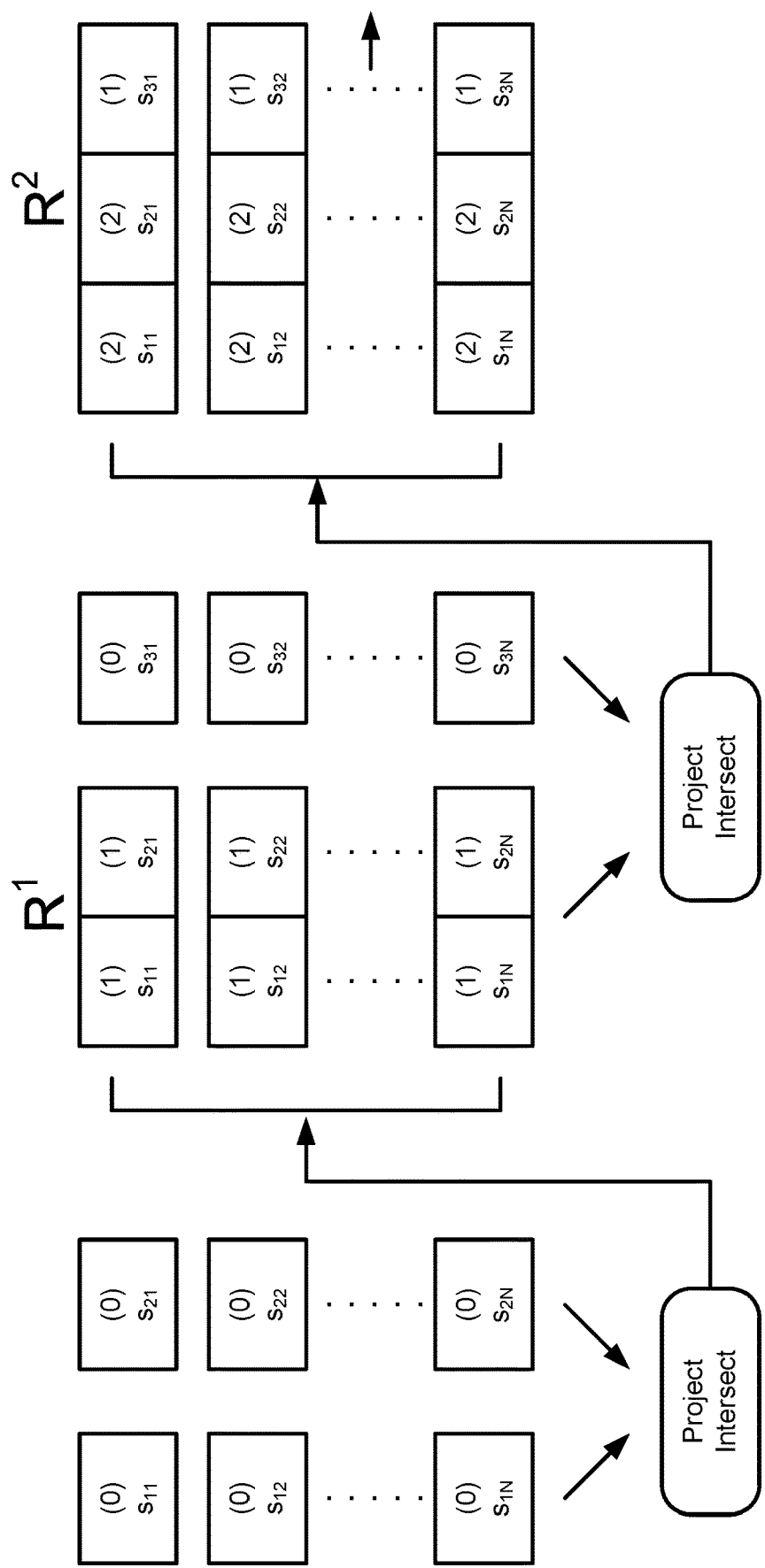
FIG. 9 illustrates how surfaces for each contact are filtered using this project and intersection technique to produce a set of surfaces that produce a valid motion sequence.

First considering a nondeformable motion skill, FIG. 8 illustrates a projection and intersection operation for a nondeformable motion skill, according to some embodiments. Generally, if two contact services are parallel to each other, the overlapping region will be a 2-D polygon or null. If two contact surfaces are in arbitrary positions relative to each other, the overlapping region will either be a line segment or null. Using, set notation, for a pair of contacts ($c_i$, $c_j$)∈C, let $\hat{v}_{i,j}$ represent the unit vector along the direction of $p_i - p_j$. Let d denote the desired distance between the two contacts $c_i$, $c_j$. Let $S_i$, $S_j$ be the set of contact surfaces that have the same normal direction as $n_i$ and $n_j$ respectively. Let $s_a$, $s_b$ be a pair of contact surfaces in $S_i \times S_j$. The boundary points of $s_a$ can be translated along $\hat{v}_{a,b} \cdot d$ and checked to see if the translated surface overlaps with $s_b$ to produce $s_a'$ (a polygon intersection operation). This process may be repeated for $s_b$ to return the pair of subsurfaces $\langle s_a', s_b' \rangle$ that satisfy the spatial constraint between the two contacts. If either of the translated surfaces do not overlap, this constraint is not satisfied between $s_a$, $s_b$. FIG. 9 illustrates how surfaces for each contact can be filtered using this project and intersection technique to produce a set of surfaces R that produce a valid motion sequence. The following algorithm summarizes these operations as depicted in FIGS. 8-9.

$$s_a^* \leftarrow s_a + \hat{v}_{i,j} \cdot d \qquad 1.$$

$$s_b' = s_a^* \cap s_b \qquad 2.$$

$$s_b^* = s_b - \hat{v}_{i,j} \cdot d \qquad 3.$$

$$s_a' = s_b^* \cap s_a \qquad 4.$$

$$\text{return } \langle s_a', s_b' \rangle \qquad 5.$$

Figure 10:
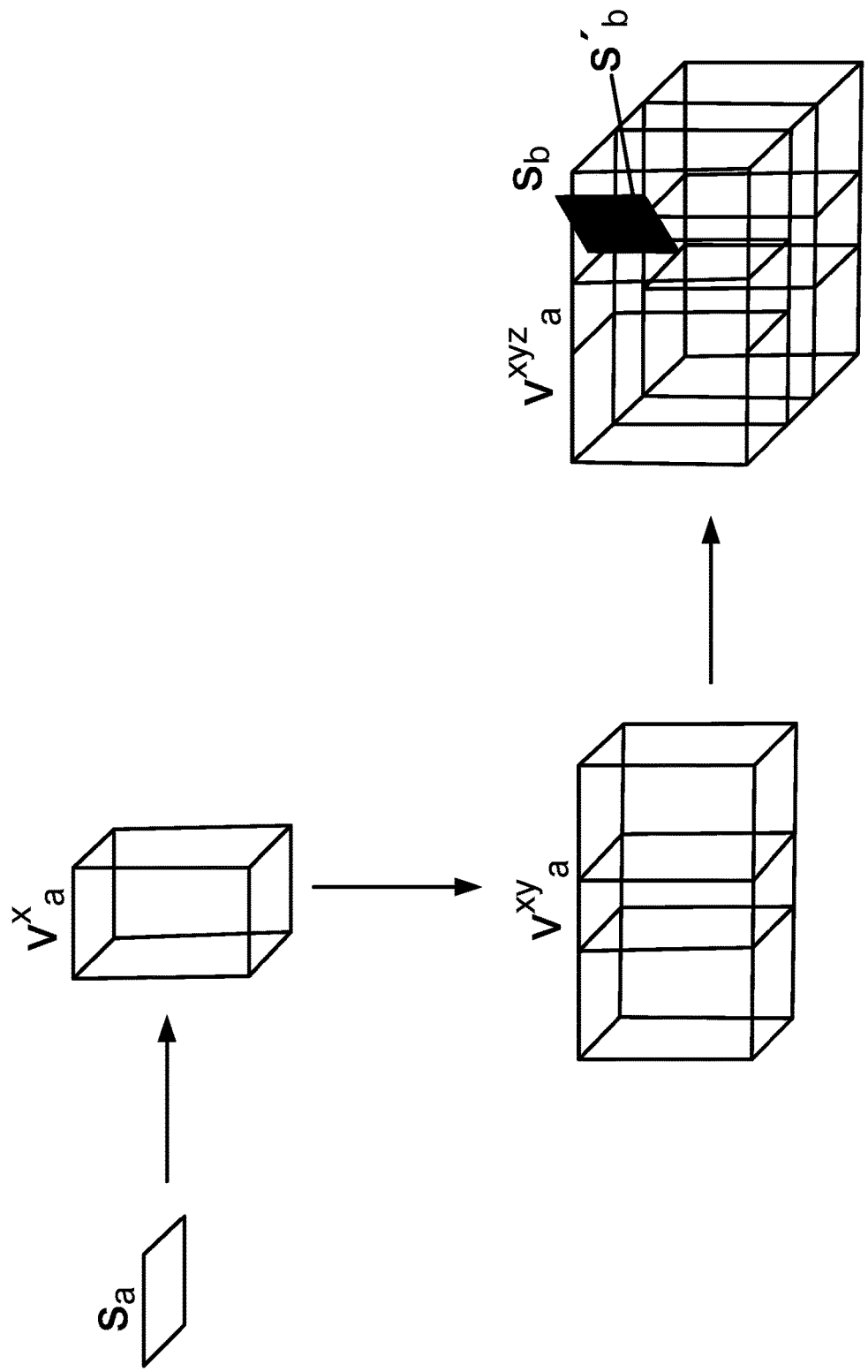
FIG. 10 illustrates the projection and intersection process for a deformable motion sequence.

For a deformable motion sequence, the spatial constraints between contacts for deformable motion sequences will be distance intervals, (dmin, dmax). The projection step is no longer simply translation along a vector, but instead is the expansion of the contact surface into a volume of admissible points, as defined by the constraint interval. Surface $s_a$ can first be translated along the vector $\hat{v}_{i,j}$, and then a volume $v_a^{xyz}$ can be constructed by sweeping $s_a$ by (dmin, dmax) along each of the coordinate axes. The intersection of the sweep volume $v_a^{xyz}$ and the surface $s_b$ gives the subsurface $s_b'$, that satisfies the spatial constraint interval. The same process may also be applied for $s_b$. FIG. 10 illustrates the projection and intersection process for a deformable motion sequence. The contact surface $s_a$ may be swept along the X, Y, and Z axes to form the sweep volume $v_a^{xyz}$. The intersection of $s_b$ and $v_a^{xyz}$ gives the subsurface $s_b'$ that satisfies the contact constraint. The following algorithm summarizes this operation as depicted in FIG. 10.

$$s_a^* = s_a + \hat{v}_{i,j} \quad\quad 1.$$

$$v_a^x = \text{Sweep}(s_a^*, d\text{min} \cdot \hat{x}, d\text{max} \cdot \hat{x}) \quad\quad 2.$$

$$v_a^{xy} = \text{Sweep}(v_a^{x*}, d\text{min} \cdot \hat{y}, d\text{max} \cdot \hat{y}) \quad\quad 3.$$

$$v_a^{xyz} = \text{Sweep}(v_a^{x**}, d\text{min} \cdot \hat{z}, d\text{max} \cdot \hat{z}) \quad\quad 4.$$

$$s_b' = v_a^{xyz} * \cap s_b \quad\quad 5.$$

$$s_b^* = s_b - \hat{v}_{i,j} \quad\quad 6.$$

$$v_b^x = \text{Sweep}(s_b^*, d\text{min} \cdot \hat{x}, d\text{max} \cdot \hat{x}) \quad\quad 7.$$

$$v_b^{xy} = \text{Sweep}(v_b^{x*}, d\text{min} \cdot \hat{y}, d\text{max} \cdot \hat{y}) \quad\quad 8.$$

$$v_b^{xyz} = \text{Sweep}(v_b^{x**}, d\text{min} \cdot \hat{z}, d\text{max} \cdot \hat{z}) \quad\quad 9.$$

$$s_a' = v_b^{xyz} * \cap s_a \quad\quad 10.$$

$$\text{return } \langle s_a', s_b' \rangle \quad\quad 11.$$

The computational efficiency of this approach facilitates the dynamic repair of computed motion transitions, which opens up the possibility of several new applications such as interactive authoring and dynamic game worlds. For example, as a virtual environment designer moves geometries around the virtual environment, the process of identifying locations for motion sequences does not need to start all over again from scratch. Instead, a streamlined approach can be used by some embodiments to reanalyze the geometry placement by analyzing only the moved geometry and geometries that are in close proximity to the movement.

Figure 11:
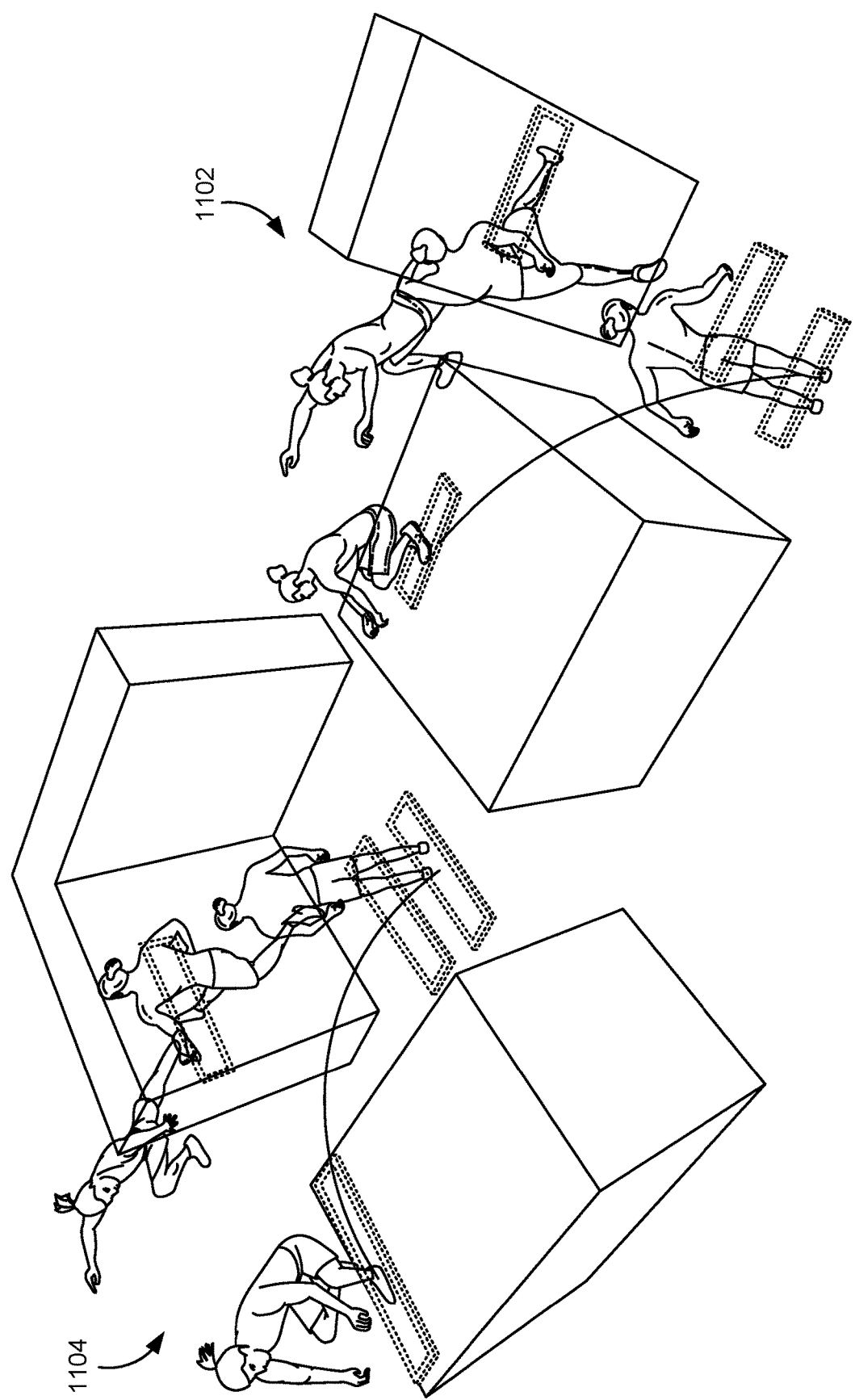
FIG. 11 illustrates the surface gathering process for the tic-tac motion sequence, according to some embodiments.

FIG. 11 illustrates the surface gathering process for the tic-tac motion sequence, according to some embodiments. After analyzing the gathered surfaces in the environment, a first location 1102 has been located where the tic-tac motion sequence can be performed. Additionally, a second location 1104 is also been located where the tic-tac motion can be performed. Note that the execution of the motion sequence at the second location 1104 is rotated 90° counterclockwise compared to the direction of the motion sequence at the first location 1102.

When a user moves an object o in the scene W, some embodiments may identify: (1) $S_o$, denoting the surfaces on the object that was moved, and (2) $S_m$, denoting the surfaces in the movement vicinity. For both the new and old locations of o, the process can consider the environment surfaces within these areas as candidates for new motion sequences. Note that both the removal and insertion of an object may result in new motion sequence possibilities. The radial distance to define these areas "in the movement vicinity" may be considered as the longest distance traveled by the character during any of its motion skills. The set of all motion sequences $R_o \subset R$ that used one or more surfaces for support from $S_o$ are removed from R. Additionally, a new set of motion transitions $R_m$ are found by executing the following algorithm using only the contact surfaces in $S_m$ to produce a new set of motion transitions $R_{new} \leftarrow R \leftarrow R_o + R_m$, which characters can use for navigation.

Figure 12A:
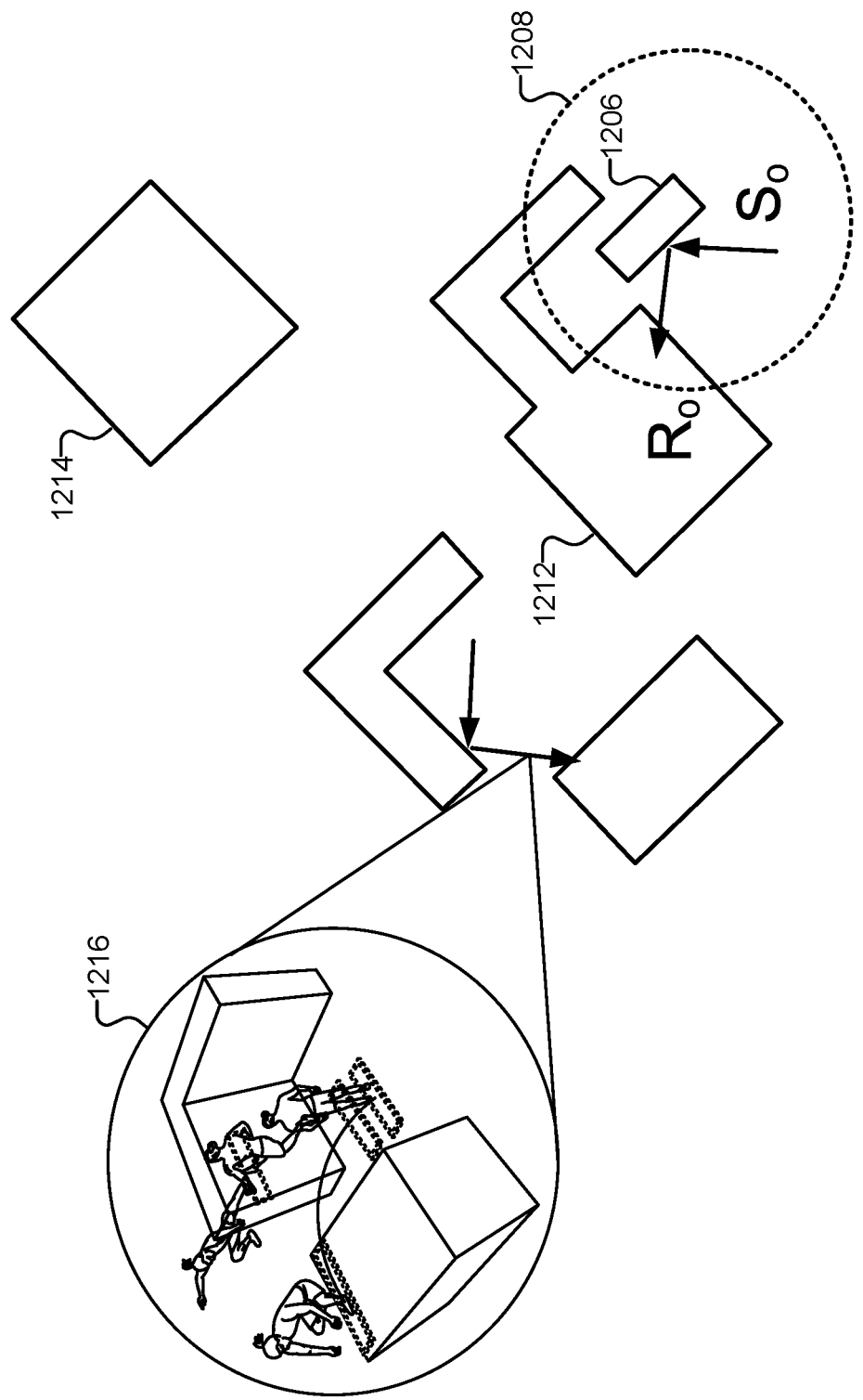
FIGS. 12A-12B illustrate the procedure for dynamically repairing motion transitions, according to some embodiments.
Figure 12B:
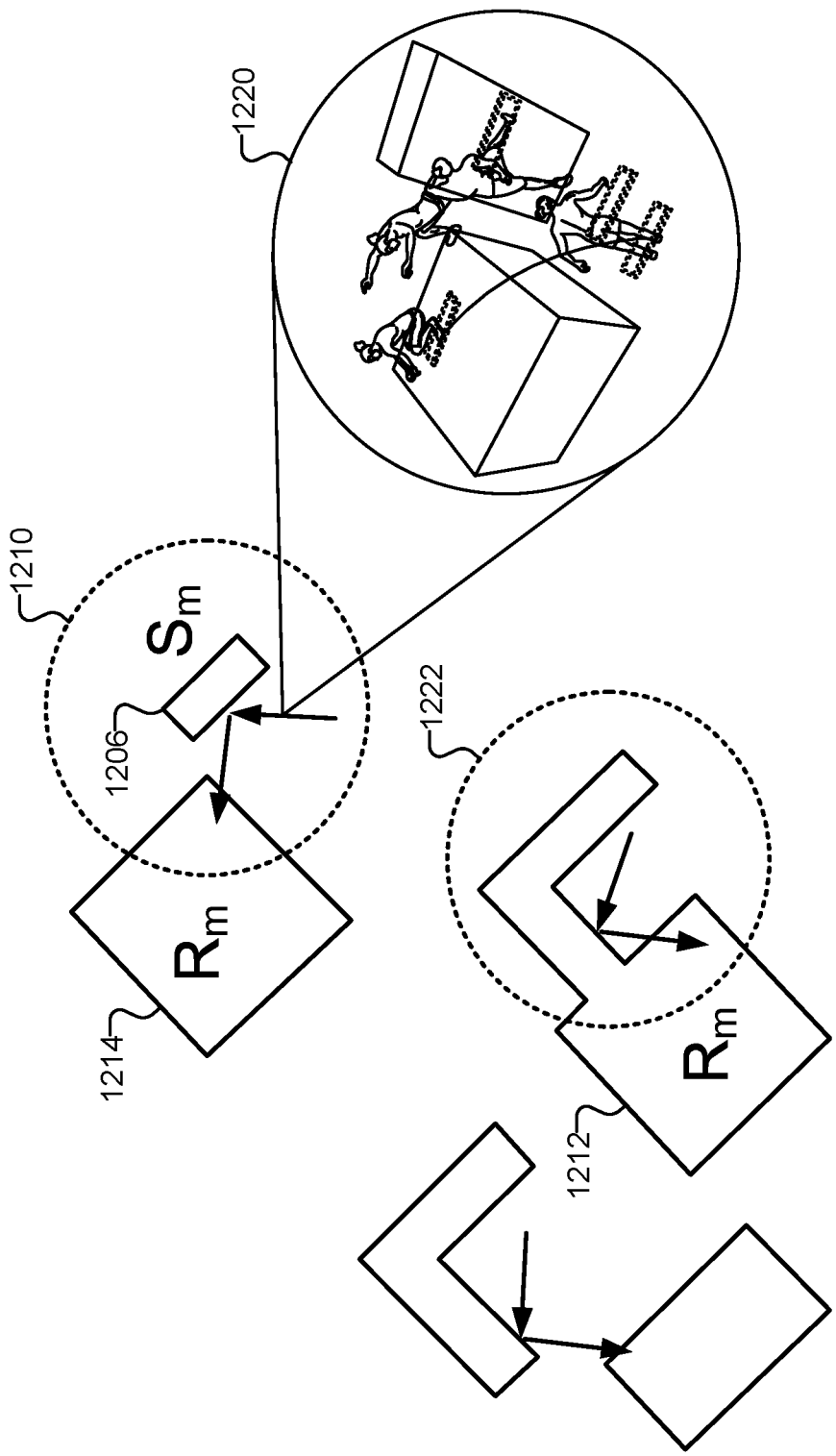

1. foreach m ∈ M do
2.   foreach θ ∈ (0, 2π) do
3.     foreach i ∈ (1, |$C_m$|) do
4.       $c_i^\theta$ = Rotate($c_i$, θ)
5.       foreach s ∈ S do
6.         if $n_s \cdot n_{c_i^\theta} \leq \epsilon$ then
7.           $S_i \leftarrow S_i \cup s$
8.     R ← $S_1$
9.     foreach i ∈ (2, |$C_m$|) do
10.       $R_t \leftarrow \emptyset$
11.       foreach ($s_a$, $s_b$) ∈ R × $S_i$ do
12.         $\hat{v}_{i-1,i} \leftarrow \dfrac{P_{i-1} - P_i}{\|P_{i-1} - P_i\|}$
13.         $\langle s_a', s_b' \rangle$
            ProjectIntersect($s_a$, $s_b$, $v_{i-1}$, i, $d_{min}$, $d_{max}$)
14.         $R_t \leftarrow R_t \cup \langle s_a', s_b' \rangle$
15.       R ← $R_t$
16.   R ← CollisionCheck(R, $V_m$);
17. return R FIGS. 12A-12B illustrate the procedure for dynamically repairing motion transitions, according to some embodiments. FIG. 12A illustrates an overhead view of the scene comprising various obstacles that can be used by an animated character to perform a motion sequence. In this example, the process will focus on the tic-tac motion sequence of a character pushing off of a vertical wall to jump up onto a platform. In this scene, the algorithm described above has located two locations 1208, 1216 where the tic-tac motion sequence can be performed. At location 1208, the animated character will first push off of object 1206 in order to jump up to platform 1212. The surfaces in motion sequences defined as $R_o$ and $S_o$ are labeled in FIG. 12A.

FIG. 12B illustrates the same scene, except that object 1206 has been moved to a new location 1210. Because object 1206 has been moved, the algorithm described above can be executed to identify new locations that may be candidates for the tic-tac motion sequence. Instead of analyzing the entire scene, including each of the environmental geometries, the algorithm described above will analyze only the surfaces that are near the object 1206 either before or after the object 1206 was moved. The output of the algorithm indicates that two new locations 1210, 1222 are now available as locations where the tic-tac motion sequence can be performed. At location 1222, an extension of platform 1212 can be used by the character to push off to gain access to the top of platform 1212. This location was previously inaccessible due to the location of object 1206 in FIG. 12A. Location 1210 allows the animated character to push off on the new location of object 1206 in order to gain access to the top of platform 1214.

Figure 13:
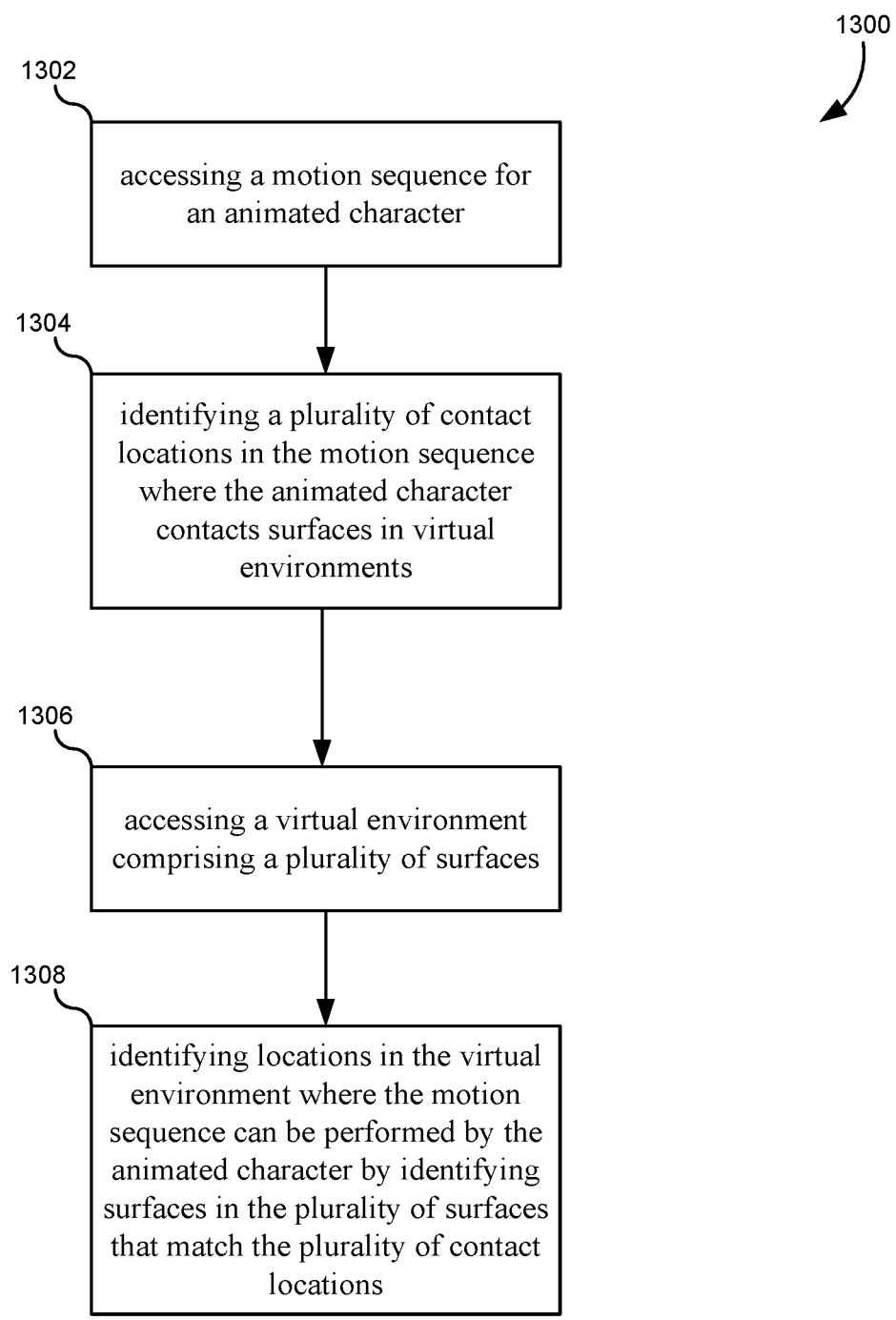
FIG. 13 illustrates a flowchart of a method for identifying locations in a virtual scene where a motion sequence can be performed by an animated character, according to some embodiments.

FIG. 13 illustrates a flowchart of a method for identifying locations in a virtual scene where a motion sequence can be performed by an animated character, according to some embodiments. The method may include accessing a motion sequence for an animated character (1302). The motion sequence may be represented by sequence of motion frames. The motion sequence may include a hurdling sequence, a tic-tac sequence, a climbing sequence, and a crawling sequence. The motion sequence may also include a deformable motion sequence, such that at least one pair of contact locations in the plurality of contact locations can be a variable distance apart.

The method may also include identifying a plurality of contact locations in the motion sequence where the animated character contacts surfaces in virtual environments (1304). In some implantations, the method may also include calculating distances between the plurality of contact locations, generating a constraint graph using the plurality of contact locations and the distances between the plurality of contact locations, and/or rotating, shifting, and/or translating the constraint graph to identify surfaces that satisfy spatial constraints between the plurality of contact locations.

The method may additionally include accessing a virtual environment comprising a plurality of surfaces (1306). In some embodiments, the plurality of surfaces may be comprised of a plurality of discrete triangles generated in an environmental modeling process. In these embodiments, the method may also include clustering adjacent ones of the discrete triangles into larger surfaces that have same surface normal, and performing a breadth-first expansion to neighboring ones of the larger surfaces with same surface normals. Some embodiments may also represent a collision volume of the animated character using a combination of cylinders, and use a compound collider to test for collisions at each of the locations in the virtual environment where the motion sequence can be performed by the animated character.

The method may further include identifying locations in the virtual environment where the motion sequence can be performed by the animated character by identifying surfaces in the plurality of surfaces that match the plurality of contact locations (1308). In some embodiments, identifying surfaces in the plurality of surfaces that match the plurality of contact locations may include receiving a motion path for the animated character, and identifying surfaces in the plurality of surfaces that match the plurality of contact locations along the motion path. Some embodiments may also include displaying, in an environment editing software application, the virtual environment, a graphical representation of the motion path, and graphical indications of the locations in the virtual environment where the motion sequence can be performed by the animated character.

It should be appreciated that the specific steps illustrated in FIG. 13 provide particular methods of identifying locations in a virtual scene where a motion sequence can be performed by an animated character according to various embodiments of the present invention. Other sequences of steps may also be performed according to alternative embodiments. For example, alternative embodiments of the present invention may perform the steps outlined above in a different order. Moreover, the individual steps illustrated in FIG. 13 may include multiple sub-steps that may be performed in various sequences as appropriate to the individual step. Furthermore, additional steps may be added or removed depending on the particular applications. One of ordinary skill in the art would recognize many variations, modifications, and alternatives.

Runtime Navigation and Motion Synthesis

The motion sequence detection algorithms described above may produce a set of surface sequences R that correspond to using the specific motion sequence in the environment. Each surface sequence $r=\langle s_1, \ldots s_{|C|}\rangle$ identifies the surfaces of the environment which can be used to support all the contacts C for a particular motion sequence m. The surface $s_1$ represents the set of all possible locations from which the character can successfully start executing m without violating contact or collision constraints. The value of $s_{|C|}$ represents the surface where the character ends the motion. This translates to a motion transition t: $s_1 \rightarrow s_{|C|}$ which uses the motion sequence, m. T is the set of all motion transitions for all elements in R.

Figure 14:
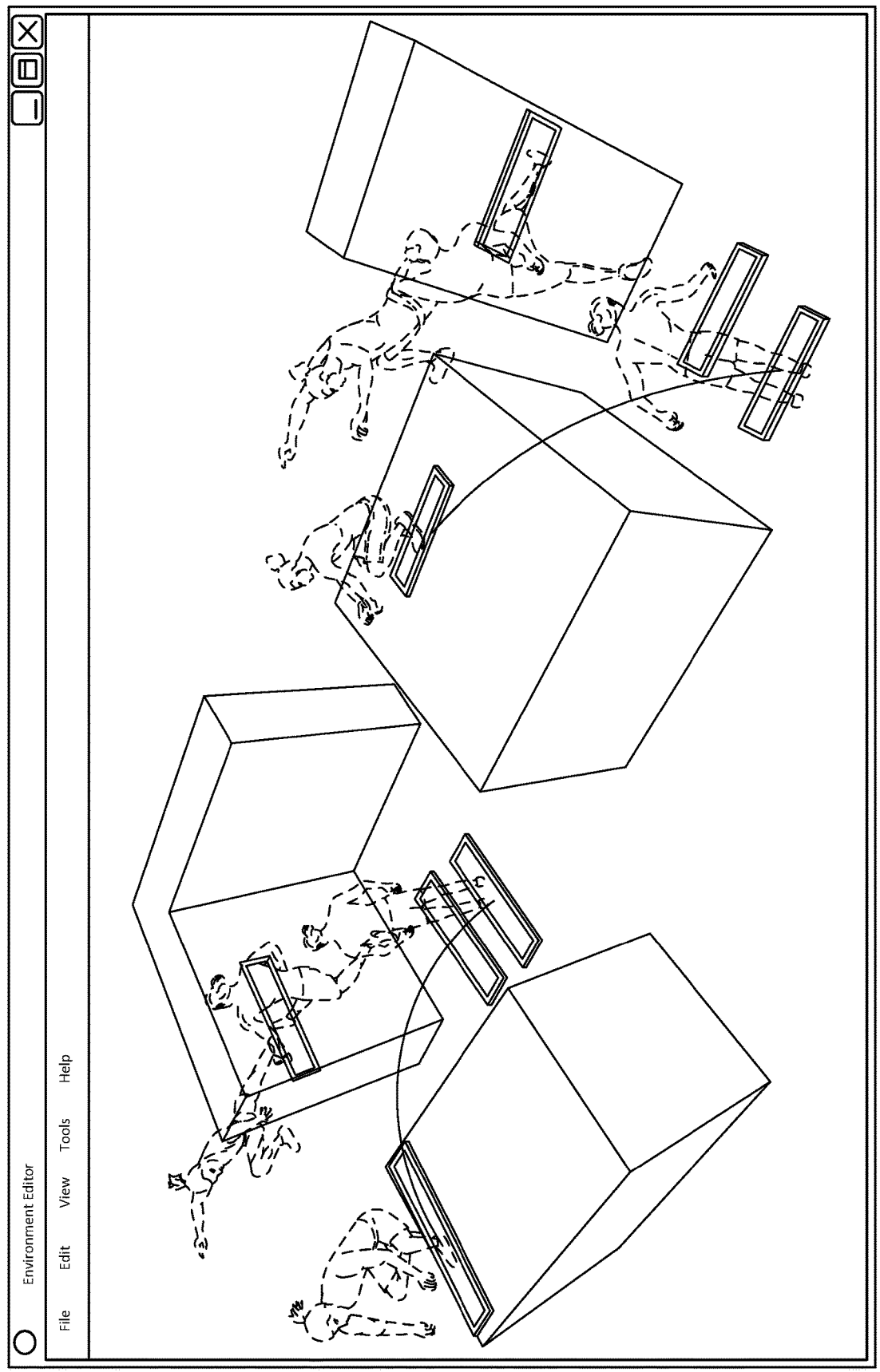
FIG. 14 illustrates a navigation mesh extended with motion sequences in a software tool for entering virtual environments, according to some embodiments.

Let $\Sigma = \langle N, A \rangle$ be a navigation graph generated using standard approaches such as navigation meshes or roadmaps, where N are walkable regions in the environment (e.g., polygonal surfaces) and A represent valid transitions between elements in N using simple locomotion behaviors (e.g., walking or running). An extended navigation graph $\Sigma^+ = \langle N \cup S, A \cup R \rangle$ can next be generated that includes the transitions between previously disconnected environment surfaces using the extended set of motion sequences available to the character. FIG. 14 illustrates a navigation mesh extended with motion sequences in a software tool for entering virtual environments, according to some embodiments.

Given the current and desired location of the character $s_o$, $s_g$ respectively, standard discrete search methods can be used, such as A* to generate a plan $\pi = \text{Plan}(s_0, s_g, \Sigma^+)$ which can include one or more motion transitions $t \in T$. A steering system can be used to move the root of the character along the computed path while avoiding other characters. Note that the steering system might only used while moving (walking or running) along standard transitions A in the navigation graph. The motion synthesis system described below superimposes an animated character to follow the trajectory generated by steering, and handles the motion of the character while traversing motion transitions $t \in T$.

Once the path π is determined, the animation system may synthesize a continuous motion to move the character from its current position to the target. A standard move graph approach may be used to construct a set of animation states, corresponding to the various movement capabilities of the character. For example, there may be a "locomotion" state that handles the basic movement such as walking or running. There is one animation state for each new motion sequence which can be easily added into an existing animation state machine by defining the appropriate transitions between motion states. This state machine can be manually constructed, but automated solutions can also be used. A full-body inverse kinematics solver can be used to produce minor deformations to the motion to enforce contact constraints at specific keyframes in the motion.

Each motion transition specifies which motion sequence to use, an facing direction of the character, an admissible start region, and an desired entry speed (e.g., a tic-tac motion skill may require the character to be running prior to entry). This imposes position, orientation, and speed constraints that the character must satisfy. A naive stop and turn strategy may be used to allow the character to simply move to the desired location and then turn in place. However, this introduces undesirable motion discontinuities and violates speed constraints for more dynamic behaviors.

A second strategy that works well for these applications is to generate a cubic Bezier curve using the current position and orientation of the character to select the initial control points, and adaptively sampling a target location in the start region while meeting the desired orientation constraint, to produce a collison-free continuous path. The character linearly interpolates from its current speed to the desired speed while traveling along the curve. In the remote case that no collision-free curve is found, the character continues to move along a straight line towards the centre of the start region, and repeats the process.

The performance of this approach can be evaluated in its ability to detect a variety of motions in complex 3D environments. A total of 16 motion sequences wer used, including climbing, squat and roll, double hand vaults, precision jumps etc. All results were generated using a single-threaded application on a Macbook Pro, 2.4 Ghz Intel Core i7 processor, with 8 GB 1600 Mhz DDR3 RAM.

The embodiments described herein proved to be robust to the position and shapes of objects where different configurations of object locations and scales produce variations in the admissible start region for the motion transition, or produce no valid motion transition at all. The presence of objects may split start regions into independent motion transitions or may also introduce holes in the start region area. This system seamlessly integrates into existing navigation and animation pipelines to produce virtual characters that can autonomously reason about their environments while harnessing an increased repertoire of motion skills to navigate in complex virtual worlds.

Figure 15A:
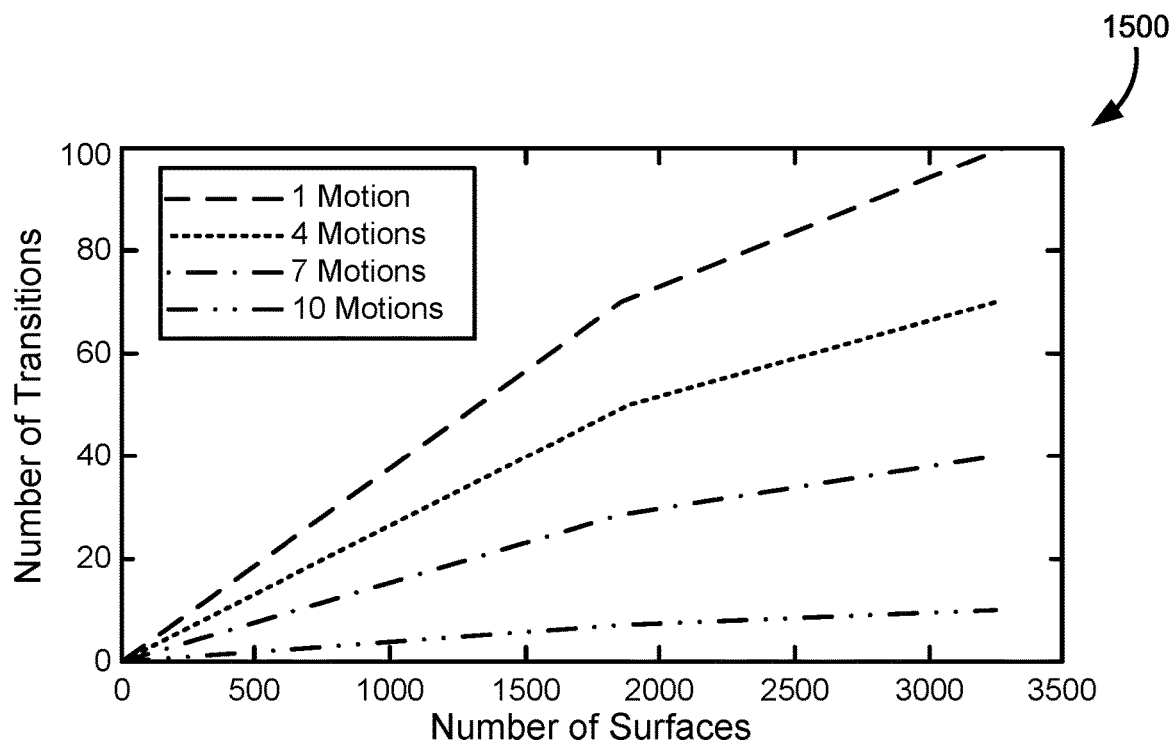
FIGS. 15A-15B illustrate an analyses the computational efficiency of some of the embodiments described herein.
Figure 15B:
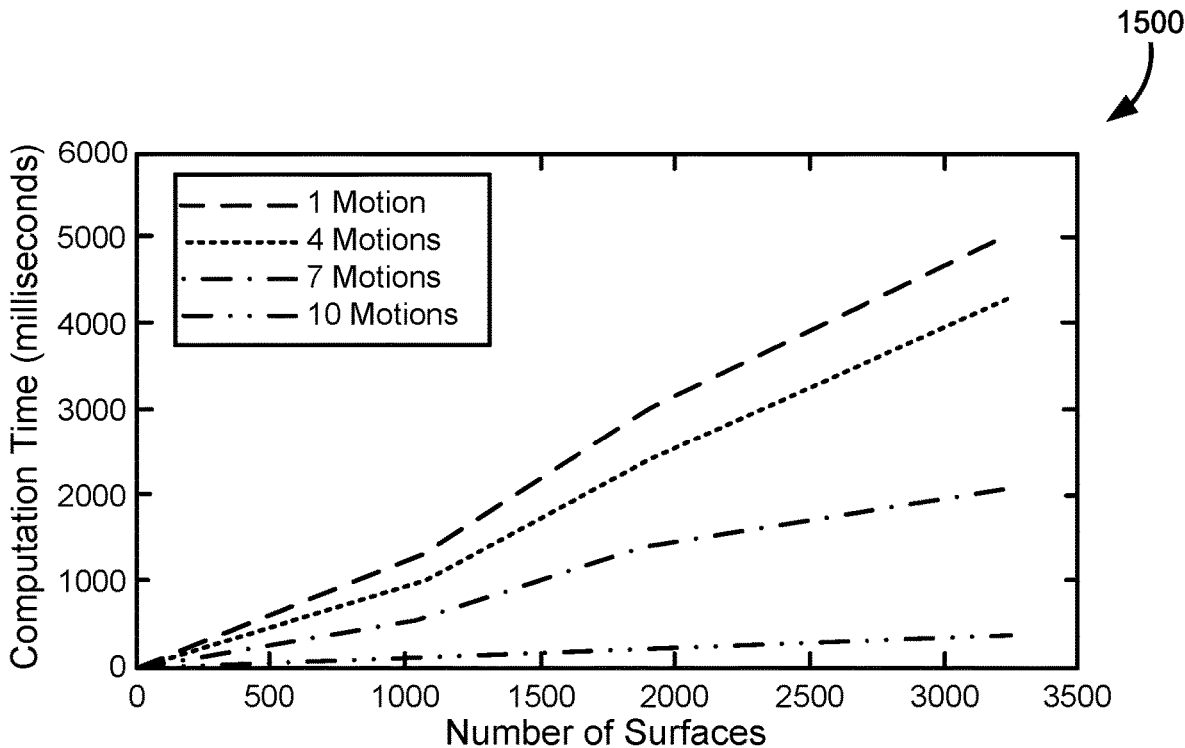

FIGS. 15A-15B illustrate an analyses the computational efficiency of some of the embodiments described herein. For complex environments with greater than 3000 surface elements (more than 20,000 triangles), nearly 100 motion transitions for 10 motion skills were detected within 5 seconds. For local repair of motion transitions for dynamic and interactive use, the operation is virtually instantaneous.

Figure 16:
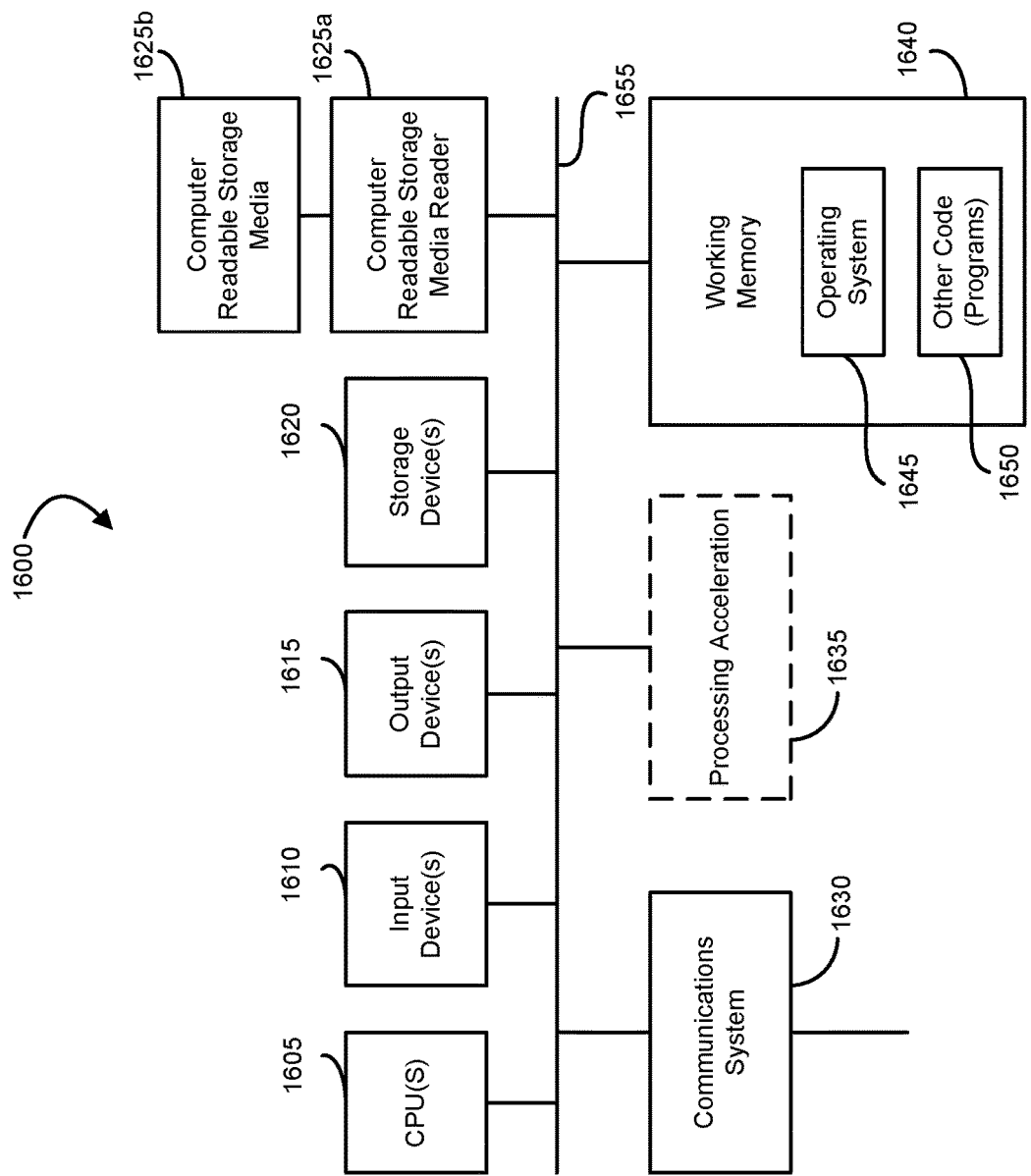
FIG. 16 illustrates an exemplary computer system, in which parts of various embodiments of the present invention may be implemented.

Each of the embodiments disclosed herein may be implemented in a special-purpose or a general-purpose computer system. FIG. 16 illustrates an exemplary computer system 1600, in which parts of various embodiments of the present invention may be implemented. The system 1600 may be used to implement any of the computer systems described above. The computer system 1600 is shown comprising hardware elements that may be electrically coupled via a bus 1655. The hardware elements may include one or more central processing units (CPUs) 1605, one or more input devices 1610 (e.g., a mouse, a keyboard, etc.), and one or more output devices 1615 (e.g., a display device, a printer, etc.). The computer system 1600 may also include one or more storage device 1620. By way of example, storage device(s) 1620 may be disk drives, optical storage devices, solid-state storage device such as a random access memory ("RAM") and/or a read-only memory ("ROM"), which can be programmable, flash-updateable and/or the like.

The computer system 1600 may additionally include a computer-readable storage media reader 1625a, a communications system 1630 (e.g., a modem, a network card (wireless or wired), an infra-red communication device, etc.), and working memory 1640, which may include RAM and ROM devices as described above. In some embodiments, the computer system 1600 may also include a processing acceleration unit 1635, which can include a DSP, a special-purpose processor, a Graphic Processing Unit (GPU), and/or the like.

The computer-readable storage media reader 1625a can further be connected to a computer-readable storage medium 1625b, together (and, optionally, in combination with storage device(s) 1620) comprehensively representing remote, local, fixed, and/or removable storage devices plus storage media for temporarily and/or more permanently containing computer-readable information. The communications system 1630 may permit data to be exchanged with the network 1620 and/or any other computer described above with respect to the system 1600.

The computer system 1600 may also comprise software elements, shown as being currently located within a working memory 1640, including an operating system 1645 and/or other code 1650, such as an application program (which may be a client application, web browser, mid-tier application, RDBMS, etc.). It should be appreciated that alternate embodiments of a computer system 1600 may have numerous variations from that described above. For example, customized hardware might also be used and/or particular elements might be implemented in hardware, software (including portable software, such as applets), or both. Further, connection to other computing devices such as network input/output devices may be employed. Software of computer system 1600 may include code 1650 for implementing embodiments of the present invention as described herein.

Each of the methods described herein may be implemented by a computer system, such as computer system 1600 in FIG. 16. Each step of these methods may be executed automatically by the computer system, and/or may be provided with inputs/outputs involving a user. For example, a user may provide inputs for each step in a method, and each of these inputs may be in response to a specific output requesting such an input, wherein the output is generated by the computer system. Each input may be received in response to a corresponding requesting output. Furthermore, inputs may be received from a user, from another computer system as a data stream, retrieved from a memory location, retrieved over a network, requested from a web service, and/or the like. Likewise, outputs may be provided to a user, to another computer system as a data stream, saved in a memory location, sent over a network, provided to a web service, and/or the like. In short, each step of the methods described herein may be performed by a computer system, and may involve any number of inputs, outputs, and/or requests to and from the computer system which may or may not involve a user. Those steps not involving a user may be said to be performed by the computer without human intervention. Therefore, it will be understood in light of this disclosure, that each step and each method described herein may be altered to include an input and output to and from a user, or may be done automatically by a computer system. Furthermore, some embodiments of each of the methods described herein may be implemented as a set of instructions stored on a tangible, non-transitory storage medium to form a tangible software product.

In the foregoing description, for the purposes of illustration, methods were described in a particular order. It should be appreciated that in alternate embodiments, the methods may be performed in a different order than that described. It should also be appreciated that the methods described above may be performed by hardware components or may be embodied in sequences of machine-executable instructions, which may be used to cause a machine, such as a general-purpose or special-purpose processor or logic circuits programmed with the instructions to perform the methods. These machine-executable instructions may be stored on one or more machine readable mediums, such as CD-ROMs or other type of optical disks, floppy diskettes, ROMs, RAMs, EPROMs, EEPROMs, magnetic or optical cards, flash memory, or other types of machine-readable mediums suitable for storing electronic instructions. Alternatively, the methods may be performed by a combination of hardware and software.

What is claimed is:

1. A method of identifying locations in a virtual environment where a motion sequence can be performed by an animated character, the method comprising:
  accessing the motion sequence for the animated character performed in a first environment;

identifying a plurality of contact locations in the motion sequence where the animated character contacts surfaces in the first environment;
accessing the virtual environment comprising a plurality of surfaces;
identifying the locations in the virtual environment where the motion sequence can be performed by the animated character by identifying surfaces in the plurality of surfaces that match the plurality of contact locations in the first environment; and
annotating the locations in the virtual environment where the motion sequence can be performed by the animated character.

2. The method of claim 1, further comprising calculating distances between the plurality of contact locations.

3. The method of claim 2, further comprising generating a constraint graph using the plurality of contact locations and the distances between the plurality of contact locations.

4. The method of claim 3, wherein identifying the surfaces in the plurality of surfaces that match the plurality of contact locations comprises:
rotating, shifting, and/or translating the constraint graph to identify surfaces that satisfy spatial constraints between the plurality of contact locations.

5. The method of claim 1, wherein the motion sequence comprises a deformable motion sequence, such that at least one pair of contact locations in the plurality of contact locations can be a variable distance apart.

6. The method of claim 1, wherein the motion sequence comprises a selection from the group consisting of: a jump sequence, a hurdling sequence, a tic-tac sequence, a climbing sequence, and a crawling sequence.

7. The method of claim 1, wherein the motion sequence is represented by a sequence of motion frames.

8. The method of claim 7, wherein identifying the plurality of contact locations in the motion sequence comprises:
identifying one or more keyframes in the sequence of motion frames that include a discontinuity in a direction or rate of motion of the animated character.

9. A non-transitory, computer-readable medium comprising instructions that, when executed by one or more processors, causes the one or more processors to perform operations comprising:
accessing a motion sequence for an animated character performed in a first environment;
identifying a plurality of contact locations in the motion sequence where the animated character contacts surfaces in the first environment;
accessing a virtual environment comprising a plurality of surfaces;
identifying locations in the virtual environment where the motion sequence can be performed by the animated character by identifying surfaces in the plurality of surfaces that match the plurality of contact locations in the first environment; and
annotating the locations in the virtual environment where the motion sequence can be performed by the animated character.

10. The non-transitory, computer-readable medium according to claim 9 comprising additional instruction that cause the one or more processors to perform additional operations comprising:
representing a collision volume of the animated character using a combination of cylinders; and
using a compound collider to test for collisions at each of the locations in the virtual environment where the motion sequence can be performed by the animated character.

11. The non-transitory, computer-readable memory according to claim 9 wherein the virtual environment comprises a plurality of discrete triangles generated in an environmental modeling process.

12. The non-transitory, computer-readable medium according to claim 11 comprising additional instruction that cause the one or more processors to perform additional operations comprising:
clustering adjacent ones of the discrete triangles into larger surfaces that have same surface normals; and
performing a breadth-first expansion to neighboring ones of the larger surfaces with same surface normals.

13. The non-transitory, computer-readable memory according to claim 9 wherein identifying surfaces in the plurality of surfaces that match the plurality of contact locations comprises:
receiving a motion path for the animated character; and
identifying surfaces in the plurality of surfaces that match the plurality of contact locations along the motion path.

14. The non-transitory, computer-readable memory according to claim 13 comprising additional instruction that cause the one or more processors to perform additional operations comprising:
displaying, in an environment editing software application:
the virtual environment;
a graphical representation of the motion path; and
graphical indications of the locations in the virtual environment where the motion sequence can be performed by the animated character.

15. A system comprising:
one or more processors; and
one or more memory devices comprising instructions that, when executed by the one or more processors, cause the one or more processors to perform operations comprising:
accessing a motion sequence for an animated character performed in a first environment;
identifying a plurality of contact locations in the motion sequence where the animated character contacts surfaces in the first environment;
accessing a virtual environment comprising a plurality of surfaces;
identifying locations in the virtual environment where the motion sequence can be performed by the animated character by identifying surfaces in the plurality of surfaces that match the plurality of contact locations in the first environment; and
annotating the locations in the virtual environment where the motion sequence can be performed by the animated character.

16. The system of claim 15, wherein the one or more memory devices further comprise additional instructions that cause the one or more processors to perform additional operations comprising:
calculating distances between the plurality of contact locations;
generating a constraint graph using the plurality of contact locations and the distances between the plurality of contact location; and
rotating, shifting, and/or translating the constraint graph to identify surfaces that satisfy spatial constraints between the plurality of contact locations.

17. The system of claim 15, wherein the motion sequence comprises a deformable motion sequence, such that at least one pair of contact locations in the plurality of contact locations can be a variable distance apart.

18. The system of claim 15, wherein:
the motion sequence is represented by a sequence of motion frames; and
identifying the plurality of contact locations in the motion sequence comprises identifying one or more keyframes in the sequence of motion frames that include a discontinuity in a direction or rate of motion of the animated character.

19. The system of claim 15, wherein:
the virtual environment comprises a plurality of discrete triangles generated in an environmental modeling process; and
the one or more memory devices further comprise additional instructions that cause the one or more processors to perform additional operations comprising:
clustering adjacent ones of the discrete triangles into larger surfaces that have same surface normals; and
performing a breadth-first expansion to neighboring ones of the larger surfaces with same surface normals.

20. The system of claim 15, wherein identifying surfaces in the plurality of surfaces that match the plurality of contact locations comprises:
receiving a motion path for the animated character; and
identifying surfaces in the plurality of surfaces that match the plurality of contact locations along the motion path.

* * * * *

UNITED STATES PATENT AND TRADEMARK OFFICE
CERTIFICATE OF CORRECTION

| | |
|---|---|
| PATENT NO. | : 10,713,832 B2 |
| APPLICATION NO. | : 15/157161 |
| DATED | : July 14, 2020 |
| INVENTOR(S) | : Robert Sumner et al. |

It is certified that error appears in the above-identified patent and that said Letters Patent is hereby corrected as shown below:

On the Title Page

Item (73):
Replace "Disney Enterprises, Inc., Burbank, CA (US); ETH Zürich, Zürich (CH)" with --Disney Enterprises, Inc., Burbank, CA (US); ETH Zürich (Eidgenössische Technische Hochschule Zürich), Zürich (CH)--

Signed and Sealed this
Seventeenth Day of November, 2020

Andrei Iancu
*Director of the United States Patent and Trademark Office*